US012501445B2

(12) United States Patent
Noh et al.

(10) Patent No.: US 12,501,445 B2
(45) Date of Patent: *Dec. 16, 2025

(54) METHOD FOR UPLINK CHANNEL ACCESS TO UNLICENSED BAND IN WIRELESS COMMUNICATION SYSTEM AND APPARATUS FOR SAME

(71) Applicant: WILUS INSTITUTE OF STANDARDS AND TECHNOLOGY INC., Gyeonggi-do (KR)

(72) Inventors: Minseok Noh, Gyeonggi-do (KR); Jinsam Kwak, Gyeonggi-do (KR); Juhyung Son, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/439,504

(22) Filed: Feb. 12, 2024

(65) Prior Publication Data
US 2024/0244629 A1 Jul. 18, 2024

Related U.S. Application Data

(63) Continuation of application No. 17/015,055, filed on Sep. 8, 2020, now Pat. No. 11,968,680, which is a
(Continued)

(30) Foreign Application Priority Data

Mar. 25, 2016 (KR) .................. 10-2016-0036348
Mar. 31, 2016 (KR) .................. 10-2016-0039811
(Continued)

(51) Int. Cl.
*H04W 72/23* (2023.01)
*H04L 1/1812* (2023.01)
(Continued)

(52) U.S. Cl.
CPC ........... *H04W 72/23* (2023.01); *H04L 1/1812* (2013.01); *H04L 5/00* (2013.01); *H04L 5/0055* (2013.01);
(Continued)

(58) Field of Classification Search
CPC . H04W 72/23; H04W 16/14; H04W 72/0446; H04W 72/0453; H04W 74/002;
(Continued)

(56) References Cited

U.S. PATENT DOCUMENTS 10,728,919 B2   7/2020   Noh et al.
10,743,344 B2   8/2020   Noh et al.
(Continued)

FOREIGN PATENT DOCUMENTS

AU   2014268767   12/2015
CN   102356658    2/2012
(Continued)

OTHER PUBLICATIONS

Office Action dated Jan. 25, 2024 for Chinese Patent Application No. 202210031992.9 and its English translation provided by Applicant's foreign counsel.
(Continued)

*Primary Examiner* — Shawn D Miller
(74) *Attorney, Agent, or Firm* — WOMBLE BOND DICKINSON (US) LLP

(57) ABSTRACT

The present invention relates to a method for performing uplink transmission to a base station through an unlicensed cell in a wireless communication system. In particular, the invention provides a method including: receiving, from the base station, an uplink grant scheduling the uplink transmission on one or more subframes; and performing the uplink transmission on the one or more subframes using one of a first type channel access or a second type channel access
(Continued)

indicated in the uplink grant, wherein a parameter for the first type channel access is determined according to a priority included in the uplink grant, and wherein when the uplink grant indicates the second type channel access, the priority is a priority used in a downlink channel access of the base station.

16 Claims, 15 Drawing Sheets

Related U.S. Application Data continuation of application No. 16/138,936, filed on Sep. 21, 2018, now Pat. No. 10,805,950, which is a continuation of application No. PCT/KR2017/003280, filed on Mar. 27, 2017.

(30) Foreign Application Priority Data

| Jun. 24, 2016 | (KR) | 10-2016-0079634 |
| Jul. 12, 2016 | (KR) | 10-2016-0088279 |
| Aug. 25, 2016 | (KR) | 10-2016-0108045 |

(51) Int. Cl.
| H04L 5/00 | (2006.01) |
| H04L 27/26 | (2006.01) |
| H04W 16/14 | (2009.01) |
| H04W 72/0446 | (2023.01) |
| H04W 72/0453 | (2023.01) |
| H04W 74/00 | (2009.01) |
| H04W 74/0808 | (2024.01) |
| H04W 74/0833 | (2024.01) |
| H04W 74/0838 | (2024.01) |
| H04W 84/12 | (2009.01) |

(52) U.S. Cl.
CPC .............. *H04L 27/26* (2013.01); *H04W 16/14* (2013.01); *H04W 72/0446* (2013.01); *H04W 72/0453* (2013.01); *H04W 74/002* (2013.01); *H04W 74/0808* (2013.01); *H04L 5/001* (2013.01); *H04W 74/0833* (2013.01); *H04W 74/0838* (2024.01); *H04W 84/12* (2013.01)

(58) Field of Classification Search
CPC ......... H04W 74/0808; H04W 74/0833; H04W 84/12; H04W 74/0838; H04W 74/004; H04W 72/1268; H04W 72/232; H04W 72/56; H04W 74/0875; H04L 1/1812; H04L 5/00; H04L 5/0055; H04L 27/26; H04L 5/001; H04L 5/0053; H04L 27/2601; H04L 5/0094

See application file for complete search history.

(56) References Cited

U.S. PATENT DOCUMENTS

| 10,757,717 | B2 | 8/2020 | Noh et al. |
| 10,805,950 | B2 * | 10/2020 | Noh ................... H04W 74/0808 |
| 11,234,270 | B2 | 1/2022 | Noh et al. |
| 11,297,636 | B2 | 4/2022 | Noh et al. |
| 11,330,609 | B2 | 5/2022 | Noh et al. |
| 11,412,422 | B2 | 8/2022 | St et al. |
| 11,968,680 | B2 * | 4/2024 | Noh ..................... H04L 5/0053 |
| 11,991,746 | B2 | 5/2024 | Noh et al. |
| 2002/0163933 | A1 | 11/2002 | Benveniste |
| 2007/0206547 | A1 | 9/2007 | Gong et al. |
| 2010/0135319 | A1 | 6/2010 | Wang et al. |
| 2012/0184265 | A1 | 7/2012 | Love et al. |
| 2013/0107116 | A1 | 5/2013 | Charbit et al. |
| 2013/0329625 | A1 | 12/2013 | Lee et al. |
| 2014/0036881 | A1 | 2/2014 | Kim et al. |
| 2014/0044000 | A1 | 2/2014 | Charbit et al. |
| 2014/0050130 | A1 | 2/2014 | Kim et al. |
| 2014/0105158 | A1 | 4/2014 | Kim et al. |
| 2014/0112280 | A1 | 4/2014 | Lee et al. |
| 2014/0348094 | A1 | 11/2014 | Charbit et al. |
| 2014/0362780 | A1 | 12/2014 | Malladi et al. |
| 2015/0057011 | A1 | 2/2015 | Di Girolamo et al. |
| 2015/0071060 | A1 | 3/2015 | Bhushan et al. |
| 2015/0085797 | A1 | 3/2015 | Ji et al. |
| 2015/0092703 | A1 | 4/2015 | Xu et al. |
| 2015/0245232 | A1 | 8/2015 | Luo et al. |
| 2015/0319701 | A1 | 11/2015 | Ng et al. |
| 2015/0358827 | A1 | 12/2015 | Bendlin et al. |
| 2015/0365880 | A1 | 12/2015 | Malladi et al. |
| 2016/0037352 | A1 | 2/2016 | Wei et al. |
| 2016/0057770 | A1 | 2/2016 | Yerramalli et al. |
| 2016/0073344 | A1 | 3/2016 | Vutukuri et al. |
| 2016/0143014 | A1 | 5/2016 | Mukherjee et al. |
| 2016/0338054 | A1 | 11/2016 | Oh et al. |
| 2017/0048879 | A1 | 2/2017 | Zhang et al. |
| 2017/0150524 | A1 | 5/2017 | Oh et al. |
| 2017/0188387 | A1 | 6/2017 | Mukherjee et al. |
| 2017/0251464 | A1 | 8/2017 | Mukherjee |
| 2017/0280475 | A1 | 9/2017 | Yerramalli et al. |
| 2017/0280476 | A1 | 9/2017 | Yerramalli et al. |
| 2017/0332245 | A1 | 11/2017 | Huang et al. |
| 2018/0124611 | A1 | 5/2018 | Moon et al. |
| 2018/0206269 | A1 | 7/2018 | Bhorkar et al. |
| 2018/0242308 | A1 | 8/2018 | Ko et al. |
| 2019/0037582 | A1 | 1/2019 | Noh et al. |
| 2019/0098658 | A1 | 3/2019 | Noh et al. |
| 2019/0313450 | A1 | 10/2019 | Mukherjee et al. |
| 2021/0058962 | A1 | 2/2021 | Noh et al. |
| 2021/0168770 | A1 | 6/2021 | Oh et al. |
| 2021/0378010 | A1 | 12/2021 | Luo et al. |
| 2023/0388067 | A1 | 11/2023 | Noh et al. |

FOREIGN PATENT DOCUMENTS

| CN | 102415187 | 4/2012 |
| CN | 102870366 | 1/2013 |
| CN | 102986281 | 3/2013 |
| CN | 103270714 | 8/2013 |
| CN | 103518415 | 1/2014 |
| CN | 103548409 | 1/2014 |
| CN | 103891181 | 6/2014 |
| CN | 104469914 | 3/2015 |
| CN | 104540158 | 4/2015 |
| CN | 104662994 | 5/2015 |
| CN | 104685955 | 6/2015 |
| CN | 104737613 | 6/2015 |
| CN | 104919883 | 9/2015 |
| CN | 105101446 | 11/2015 |
| CN | 105230102 | 1/2016 |
| CN | 105247914 | 1/2016 |
| CN | 105282858 | 1/2016 |
| CN | 105636233 | 1/2016 |
| CN | 105392202 | 3/2016 |
| CN | 105409138 | 3/2016 |
| CN | 105611537 | 5/2016 |
| CN | 105682239 | 6/2016 |
| CN | 105722234 | 6/2016 |
| CN | 108886818 | 11/2018 |
| CN | 114499807 | 5/2022 |
| CN | 114698135 | 7/2022 |
| CN | 114698136 | 7/2022 |
| CN | 114698137 | 7/2022 |
| EP | 3 435 725 | 1/2019 |
| JP | 4206484 | 1/2009 |
| JP | 2015-515160 | 5/2015 |
| JP | 5746364 | 7/2015 |
| JP | 2015-149723 | 8/2015 |
| KR | 10-2007-0095774 | 10/2007 |
| KR | 10-2008-0028090 | 3/2008 |
| KR | 10-2010-0008322 | 1/2010 |
| KR | 10-2012-0130100 | 11/2012 |
| KR | 10-2013-0009959 | 1/2013 |

(56) References Cited

FOREIGN PATENT DOCUMENTS

| | | |
|---|---|---|
| KR | 10-2013-0084261 | 7/2013 |
| KR | 10-2013-0097586 | 9/2013 |
| KR | 10-2013-0113475 | 10/2013 |
| KR | 10-2013-0141697 | 12/2013 |
| KR | 10-2014-0012630 | 2/2014 |
| KR | 10-2014-0034290 | 3/2014 |
| KR | 10-1386198 | 4/2014 |
| KR | 10-2015-0028227 | 3/2015 |
| KR | 10-2016-0010587 | 1/2016 |
| KR | 10-2016-0013508 | 2/2016 |
| KR | 10-2016-0026555 | 3/2016 |
| KR | 10-2016-0034182 | 3/2016 |
| KR | 10-2016-0045840 | 4/2016 |
| KR | 10-2016-0052420 | 5/2016 |
| KR | 10-2016-0055044 | 5/2016 |
| KR | 10-2018-0039501 | 4/2018 |
| KR | 10-2018-0098667 | 9/2018 |
| KR | 10-2018-0120201 | 11/2018 |
| KR | 10-2019-0017588 | 2/2019 |
| KR | 10-2094287 | 3/2020 |
| KR | 10-2238673 | 4/2021 |
| KR | 10-2278751 | 6/2021 |
| KR | 10-2307319 | 10/2021 |
| KR | 10-2021-0134357 | 11/2021 |
| KR | 10-2021-0138130 | 11/2021 |
| KR | 10-2325682 | 11/2021 |
| KR | 10-2023-0016717 | 2/2023 |
| KR | 10-2024-0051263 | 4/2024 |
| KR | 10-2654467 | 4/2024 |
| WO | 2011/062393 | 5/2011 |
| WO | 2012/033665 | 3/2012 |
| WO | 2012/078565 | 6/2012 |
| WO | 2013/116662 | 8/2013 |
| WO | 2013/149387 | 10/2013 |
| WO | 2015/199494 | 12/2015 |
| WO | 2016/013781 | 1/2016 |
| WO | 2016/053836 | 4/2016 |
| WO | 2016/068659 | 5/2016 |
| WO | 2016/068667 | 5/2016 |
| WO | 2016/071741 | 5/2016 |
| WO | 2016/072685 | 5/2016 |
| WO | 2016/072916 | 5/2016 |
| WO | 2016/081375 | 5/2016 |
| WO | 2017/074638 | 5/2017 |
| WO | 2017/164647 | 9/2017 |
| WO | 2017/164719 | 9/2017 |
| WO | 2018/021783 | 2/2018 |

OTHER PUBLICATIONS

Office Action dated Feb. 5, 2024 for Chinese Patent Application No. 202210031169.8 and its English translation provided by Applicant's foreign counsel.
Notice of Allowance dated Feb. 8, 2024 for Chinese Patent Application No. 202210031956.2 and its English translation provided by Applicant's foreign counsel.
Notice of Allowance dated Feb. 13, 2024 for European Patent Application No. 17 770 689.2.
Office Actions dated Mar. 6, 2024 for U.S. Appl. No. 18/233,884.
Office Action dated Aug. 7, 2024 for European Patent Application No. 23 164 463.4.
Office Action dated Aug. 7, 2024 for U.S. Appl. No. 18/519,068.
U.S. Appl. No. 62/312,862, filed Mar. 24, 2016.
Office Action dated Sep. 30, 2024 for Chinese Patent Application No. 202210317482.8 and its English translation provided by Applicant's foreign counsel.
Extended European Search Report dated Sep. 3, 2024 for European Patent Application No. 24183654.3.
Notice of Allowance dated Oct. 24, 2024 for Chinese Patent Application No. 202211309103.7 and its English translation provided by Applicant's foreign counsel/Google Translate.
Office Action dated Oct. 30, 2024 for Korean Patent Application No. 10- 2024-7031449 and its English translation provided by Applicant's foreign counsel.
Extended European Search Report dated Oct. 21, 2024 for European Patent Application No. 24190731.0.
Nokia Networks, Alcatel-Lucent, Alcatel-Lucent Shanghai Bell: "Channel Access for the Support of LAA UL", R1-160914, 3GPP TSG RAN WG1 Meeting #84, St. Julian's, Malta, Feb. 15-19, 2016, pp. 1-7.
Notice of Allowance (2nd) dated Nov. 14, 2024 for U.S. Appl. No. 18/233,884.
Notice of Allowance dated Nov. 27, 2024 for Korean Patent Application No. 10-2023-7036841 and its English translation provided by Applicant's foreign counsel.
Notice of Allowance dated Dec. 3, 2024 for Korean Patent Application No. 10-2024-7032570 and its English translation provided by Applicant's foreign counsel.
Notice of Allowance (2nd) dated Oct. 18, 2024 for European Patent Application No. 23 164 463.4.
Office Action ($1^{st}$) dated Dec. 26, 2024 for Chinese Patent Application No. 202210317483.2 and its English translation provided by Applicant's foreign counsel.
Office Action ($1^{st}$) dated Dec. 27, 2024 for Chinese Patent Application No. 202210317480.9 and its English translation provided by Applicant's foreign counsel.
Office Action ($2^{nd}$) dated Jan. 10, 2025 for Chinese Patent Application No. 202211309078.2 and its English translation provided by Applicant's foreign counsel.
Office Action dated May 31, 2024 for Chinese Patent Application No. 202211309078.2 and its English translation provided by Applicant's foreign counsel.
Office Action dated May 28, 2024 for Chinese Patent Application No. 202211308924.9 and its English translation provided by Applicant's foreign counsel.
Samsung: "LBT for cross-carrier scheduling", 3GPP TSG RAN WG1 Meeting #84bis; R1-162670, Busan, Korea, Apr. 2, 2016, pp. 1-3.
Notice of Allowance dated Jun. 25, 2024 for Korean Patent Application No. 10-2024-7010912 and its English translation provided by Applicant's foreign counsel.
Notice of Allowance dated Jul. 1, 2024 for Korean Patent Application No. 10-2023-7033915 and its English translation provided by Applicant's foreign counsel.
Office Action dated Jul. 4, 2024 for Korean Patent Application No. 10-2023-7036841 and its English translation provided by Applicant's foreign counsel.
Office Action dated Jul. 5, 2024 for European Patent Application No. 17770689.3.
Notice of Allowance dated Jul. 2, 2024 for Chinese Patent Application No. 202210031992.9 and its English translation provided by Applicant's foreign counsel.
Office Action dated Jun. 22, 2024 for Chinese Patent Application No. 202211309103.7 and its English translation provided by Applicant's foreign counsel.
CATT: "Uplink channel access scheme for LAA Scell", 3GPP TSG RAN WG1 Meeting #84, R1-160359, St Julian's, Malta, Feb. 5, 2016, pp. 1-4.
Notice of Allowance dated Mar. 13, 2025 for Chinese Patent Application No. 202210317482.8 and its English translation provided by Applicant's foreign counsel/Google Translate.
Office Action (2nd) dated Mar. 28, 2025 for U.S. Appl. No. 18/519,068.
Notice of Allowance dated Apr. 30, 2025 for Korean Patent Application No. 10-2024-7031449 and its English translation provided by Applicant's foreign counsel.
Notice of Allowance dated May 20, 2025 for Chinese Patent Application No. 202211309078.2 and its English translation provided by Applicant's foreign counsel/Google Translate.
International Search Report for PCT/KR2017/003280 mailed on Jul. 7, 2017 and its English translation from WIPO (published as WO 2017/164719).

(56) References Cited

OTHER PUBLICATIONS

Written Opinion of the International Searching Authority for PCT/KR2017/003280 mailed on Jul. 7, 2017 and its English machine translation by Google Translate (published as WO 2017/164719).
Samsung, "Discussion on LBT for UL Grant", R1-160568, 3GPP TSG RAN WG1 #84, St. Julian's, Malta, Feb. 6, 2016, see section 2.
Huawei et al., "Analysis on LBT with Category 2 and 4 for eLAA", R1-160297, 3GPP TSG RAN WG1 Meeting #84, St. Julian's, Malta, Feb. 6, 2016, see section 2.1, 2.2.
3GPP TS 36.213 v13.0.1, "3GPP; TSGRAN; E-UTRA; Physical Layer Procedures (Release 13)", Jan. 27, 2016, see pp. 314-318.
International Preliminary Report on Patentability (Chapter I) issued on Sep. 25, 2018 for PCT/KR2017/003280 and its English translation from WIPO.
Extended European Search Report dated Sep. 17, 2019 for EP Patent Application No. 17770689.2.
Extended European Search Report dated Sep. 30, 2019 for EP Patent Application No. 17770617.3.
Non-Final Office Action dated Nov. 22, 2019 for U.S. Appl. No. 16/147,577.
Non-Final Office Action dated Dec. 2, 2019 for U.S. Appl. No. 16/138,927.
LG Electronics: "LBT schemes in LAA UL", 3GPP TSG RAN WG1 Meeting #84, St Julian's, Malta, Feb. 15-19, 2016; Draft: R1-160630; $3^{rd}$ Generation Partnership Project (3GPP), Mobile Competence Centre; 650, Route Des Lucioles; F-06921 Sophia-Antipolis Cedes, France; Feb. 6, 2016, XP051064267, Agenda Item: 7.3.1.5, pp. 1-10.
ZTE: "UL framework for LAA". 3GPP TSG RAN WG1 Meeting #83, Anaheim, USA, Nov. 15-22, 2015; Document for: Discussion and Decision; Draft: R1-156994 UL; $3^{rd}$ Generation Partnership Project (3GPP), Mobile Competence Centre; 650. Route Des Lucioles; F-06921 Sophia-Antipolis Cedes, France; Nov. 7, 2015, XP051022611, Agenda Item: 6.2.3.1, pp. 1-6.
Mediatek Inc.: "Uplink channel access in LAA", 3GPP TSG RAN WG1 Meeting #84, St Julian's, Malta, Feb. 15-19, 2016; Draft: R1-160976; $3^{rd}$ Generation Partnership Project (3GPP), Mobile Competence Centre; 650. Route Des Lucioles; F-06921 Sophia-Antipolis Cedes, France; Feb. 24, 2016, XP051079075, Agenda Item: 7.3.1.5, pp. 1-11.
LG Electronics: "PUSCH transmission in LAA", 3GPP TSG RAN WG1 Meeting #84, St Julian's, Malta, Feb. 15-19, 2016; Draft: R1-160625 LAA PUSCH; $3^{rd}$ Generation Partnership Project (3GPP), Mobile Competence Centre; 650, Route Des Lucioles; F-06921 Sophia-Antipolis Cedes, France; Feb. 14, 2016, XP051053954, Agenda Item: 7.3.1.1, pp. 1-5.
Ericsson: "On Coordinated UL Channel Access for Enhanced LAA", 3GPP TSG RAN WG1 Meeting #84, St Julian's, Malta, Feb. 15-19, 2016; Draft: R1-161000; $3^{rd}$ Generation Partnership Project (3GPP), Mobile Competence Centre; 650, Route Des Lucioles; F-06921 Sophia-Antipolis Cedes, France; Feb. 6, 2016, XP051064484, Agenda Item: 7.3.1.5, pp. 1-3.
ETSI TS 136 321 V13.0.0, Feb. 2016: LTE; Evolved Universal Terrestrial Radio Access (E_UTRA); Medium Access Control (MAC) protocol specification (3GPP TS 36.321 version 13.0.0 Release 13), pp. 1-84.
Non-Final Office Action dated Feb. 7, 2020 for U.S. Appl. No. 16/255,187.
Final Office Action dated Mar. 6, 2020 for U.S. Appl. No. 16/138,927.
Advisory Action dated Mar. 23, 2020 for U.S. Appl. No. 16/138,927.
Notice of Allowance dated Mar. 27, 2020 for U.S. Appl. No. 16/147,577.
Notice of Allowance dated Mar. 11, 2020 for U.S. Appl. No. 16/255,187.
Notice of Allowance dated Apr. 9, 2020 for U.S. Appl. No. 16/138,927.
Non-Final Office Action dated Jan. 16, 2020 for U.S. Appl. No. 16/138,936 (now published as U.S. 2019/0098658).
Notice of Allowance dated Oct. 26, 2023 for U.S. Appl. No. 17/015,055 (now published as U.S. 2021/0058962).
Office Action for Indian Patent Application No. 201827040249 mailed on Nov. 4, 2020.
Office Action for Korean Patent Application No. 10-2018-7027541 mailed on Jan. 21, 2021 and its English translation provided by Applicant's foreign counsel.
Ericsson: "On UL Cannel Access Procedures for Enhanced LAA", R1-161001, 3GPP TSG RAN WG1 Meeting #84, St. Julian', Malta, Feb. 15-19, 2016, pp. 1-8.
Office Action for Korean Patent Application No. 10-2018-7028131 mailed on Jan. 26, 2021 and its English translation provided by Applicant's foreign counsel.
Broadcom Corporation: "Discussion on Triggering Mechanisms to Adapt LBT Contention Window Size", R1-155548, 3GPP TSG WAN WG1 Meeting #82-BIS, Malmo, Sweden, Oct. 5-9, 2015, pp. 1-14.
Office Action for Indian Patent Application No. 201827038794 mailed on Mar. 23, 2021.
Office Action for European Patent Application No. 17 770 689.2 mailed on Feb. 8, 2021.
Office Action for European Patent Application No. 17 770 617.3 mailed on Feb. 15, 2021.
Office Action for Chinese Patent Application No. 201780030922.9 mailed on Apr. 30, 2021 and its English translation provided by Applicant's foreign counsel.
Office Action for Korean Patent Application No. 10-2018-7027545 mailed on Jun. 8, 2021 and its English translation provided by Applicant's foreign counsel.
Office Action for Korean Patent Application No. 10-2019-7005270 mailed on May 11, 2021 and its English translation provided by Applicant's foreign counsel.
Notice of Allowance for Korean Patent Application No. 10-2019-7005270 mailed on Jun. 8, 2021 and its English translation provided by Applicant's foreign counsel.
Wilus Inc.: "Consideration on UL LBT Type Switching for eLAA", R1-165252, 3GPP TSG RAN WG1 Meeting #85, Nanjing, China, May 23-27, 2016, pp. 1-4.
Samsung: "Discussion on UL power control for UL LAA", R1-162662, 3GPP TSG RAN WG1 Meeting #84bis, Busan, Korea, Apr. 11-15, 2016, pp. 1-3.
Lenovo: "LBT schemes for LAA DL and UL transmission", R1-154508, 3GPP TSG RAN WG1 Meeting #82, Beijing, China, Aug. 24-28, 2015, pp. 1-4.
Ericsson, [ZTE], [MediaTek], [Wilus],: "WF on MCOT limit Signaling and Modifying LBT type", R1-165716, 3GPP TSG RAN WG1 #85, Nanjing, China, May 23-27, 2016, pp. 1-4.
Notice of Allowance dated Aug. 9, 2021 for Korean Patent Application No. 10-2021-7021069 and its English translation provided by Applicant's foreign counsel.
Notice of Allowance dated May 29, 2020 for U.S. Appl. No. 16/138,936.
Office Action dated Jan. 16, 2020 for U.S. Appl. No. 16/138,936.
Office Action dated Aug. 25, 2021 for U.S. Appl. No. 16/929,058.
Notice of Allowance dated Sep. 10, 2021 for U.S. Appl. No. 16/924,142.
Office Action dated Sep. 9, 2021 for Korean Patent Application No. 10-2021-7024472 and its English translation provided by the Applicant's foreign counsel.
Office Action dated Sep. 17, 2021 for Korean Patent Application No. 10-2021-7023122 and its English translation provided by the Applicant's foreign counsel.
Office Action dated Aug. 13, 2021 for Chinese Patent Application No. 201780018454.3 and its English translation provided by the Applicant's foreign counsel.
Notice of Allowance dated Oct. 28, 2021 for Chinese Patent Application No. 201780030922.9 and its English translation provided by the Applicant's foreign counsel.
Notice of Allowance dated Jan. 10, 2022 for U.S. Appl. No. 16/929,058.
Notice of Allowance dated Jan. 14, 2022 for Chinese Patent Application No. 201780018454.3 and its English translation provided by Applicant's foreign counsel.

(56) References Cited

OTHER PUBLICATIONS

Notice of Allowance dated Mar. 21, 2022 for Korean Patent Application No. 10-2021-7023691 and its English translation provided by Applicant's foreign counsel.
Office Action dated Mar. 21, 2022 for Korean Patent Application No. 10-2021-7023122 and its English translation provided by Applicant's foreign counsel.
Office Action dated Mar. 23, 2022 for Korean Patent Application No. 10-2021-7024472 and its English translation provided by Applicant's foreign counsel.
Office Action dated Mar. 16, 2022 for Chinese Patent Application No. 201780057852.6 and its English translation provided by Applicant's foreign counsel.
Huawei, HiSilicon: "Further details on UL LBT to enable UE multiplexing of uplink transmissions", 3GPP TSG RAN WG1 Meeting #84bis, R1-162102, Busan, Korea, Apr. 11-15, 2016, pp. 1-7.
Yuan Naihua et al.: "Discussion on E-DCH SPS Initial Link Adaptation Technology of TD-SCDMA HSPA + CPC", Beijing, China, Jun. 2, 2010, pp. 108-111.
Office Action dated Oct. 19, 2021 for Korean Patent Application No. 10-2021-7023691 and its English translation provided by Applicant's foreign counsel.
Office Action dated Jul. 19, 2022 for Korean Patent Application No. 10-2022-7021156 and its English translation provided by Applicant's foreign counsel.
Office Action dated Jul. 28, 2022 for Korean Patent Application No. 10-2021-7036421 and its English translation provided by Applicant's foreign counsel.
Office Action dated Oct. 27, 2022 for Korean Patent Application No. 10-2021-7036421 and its English translation provided by Applicant's foreign counsel.
Office Action dated Nov. 16, 2022 for U.S. Appl. No. 17/681,703.
Office Action dated Nov. 4, 2022 for European Patent Application No. 17 770 689.2.
Office Action dated Dec. 1, 2022 for U.S. Appl. No. 17/548,442.
Notice of Allowance dated Nov. 25, 2022 for European Patent Application No. 17 770 617.3.
Notice of Allowance dated Dec. 14, 2022 for Korean Patent Application No. 10-2021-7023122 and its English translation provided by Applicant's foreign counsel.
Office Action dated Jan. 17, 2023 for U.S. Appl. No. 17/712,071.
Notice of Allowance dated Jan. 25, 2023 for Korean Patent Application No. 10-2022-7021156 and its English translation provided by Applicant's foreign counsel.
Notice of Allowance dated Feb. 7, 2023 for Korean Patent Application No. 10-2022-7042370 and its English translation provided by Applicant's foreign counsel.
Notice of Allowance dated Feb. 20, 2023 for Korean Patent Application No. 10-2023-7002653 and its English translation provided by Applicant's foreign counsel.
Notice of Allowance dated Mar. 6, 2023 for U.S. Appl. No. 17/681,703.
Final Office Action dated Apr. 18, 2023 for U.S. Appl. No. 17/548,442.
Hearing Notice dated Apr. 18, 2023 for Indian Patent Application No. 201827038794.
Notice of Allowance dated May 3, 2023 for U.S. Appl. No. 17/712,071.
Notice of Allowance dated Jul. 4, 2023 for Korean Patent Application No. 10-2023-7012743 and its English translation provided by Applicant's foreign counsel.
Office Action dated Jul. 13, 2023 for Korean Patent Application No. 10-2023-7016808 and its English translation provided by Applicant's foreign counsel.
Office Action dated Jul. 21, 2023 for Korean Patent Application No. 10-2022-7044161 and its English translation provided by Applicant's foreign counsel.
Notice of Allowance dated Jul. 25, 2023 for Korean Patent Application No. 10-2023-7015610 and its English translation provided by Applicant's foreign counsel.
Notice of Allowance dated Aug. 9, 2023 for U.S. Appl. No. 17/548,442.
Extended European Search Report dated Jun. 9, 2023 for EP Patent Application No. 23164463.4.
Sony Corporation: "UL Channel access mechanism design in eLAA", R1-160674, 3GPP TSG RAN WG1 Meeting #84, St. Julian', Malta, Feb. 6, 2016, pp. 1-3.
Huawei, HiSilicon: "UL LBT to enable UE multiplexing of uplink transmissions", R1-160280, 3GPP TSG RAN WG1 Meeting #84, St. Julian', Malta, Feb. 6, 2016, pp. 1-6.
Notice of Hearing dated Sep. 13, 2023 for Indian Patent Application No. 201827040249.
Notice of Allowance dated Nov. 14, 2023 for Korean Patent Application No. 10-2023-7015610 and its English translation provided by Applicant's foreign counsel.
Office Action dated Nov. 15, 2023 for Korean Patent Application No. 10-2023-7036841 and its English translation provided by Applicant's foreign counsel.
Notice of Hearing dated Nov. 23, 2023 for Indian Patent Application No. 201927006912.
Office Action dated Dec. 27, 2023 for Korean Patent Application No. 10-2023-7033915 and its English translation provided by Applicant's foreign counsel.
Notice of Allowance dated Jan. 17, 2024 for Korean Patent Application No. 10-2023-7016808 and its English translation provided by Applicant's foreign counsel.
ZTE: "Contention window size adaptation for DL LBT in LAA", 3GPP TSG RAN WG1 Meeting #82, R1-154768, Beijing, China, Aug. 24-28, 2015, pp. 1-6.
Office Action dated Jan. 22, 2024 for U.S. Appl. No. 18/207,131.
Notice of Allowance dated Jan. 23, 2024 for U.S. Appl. No. 17/712,071.
Notice of Allowance dated Jan. 23, 2024 for Korean Patent Application No. 10-2022-7044161 and its English translation provided by Applicant's foreign counsel.
Notice of Allowance dated May 29, 2020 for U.S. Appl. No. 16/138,936 (now published as U.S. 2019/0098658).
Office Action (1st) dated Jun. 2, 2025 for European Patent Application No. 24 183 654.3.
Office Action (4th) dated Jun. 2, 2025 for European Patent Application No. 17 770 689.2.
Notice of Allowance dated Jul. 7, 2025 for Chinese Patent Application No. 202210317480.9 and its English translation provided by Applicant's foreign counsel/Google Translate.
Notice of Allowance dated Jul. 7, 2025 for Chinese Patent Application No. 202210317483.2 and its English translation provided by Applicant's foreign counsel/Google Translate.
Office Action (2nd) dated Oct. 23, 2025 for European Patent Application No. 24 190 731.0.
Intel Corporation: "On the remaining details for UL LBT", 3GPP TSG RAN WG1 Meeting #84, R1-160424, St. Julian's, Malta, Feb. 6, 2016 (Feb. 6, 2016), XP051064183, pp. 1-5.
LG Electronics et al.: "Correction on CWS adjustment in LAA", 3GPP TSG-RAN WG1 Meeting #84, R1-161534, St Julian's, Malta, Feb. 24, 2016 (Feb. 24, 2016), XP051079438, pp.
Office Action (2nd) dated Oct. 30, 2025 for European Patent Application No. 24 183 654.3.

\* cited by examiner

METHOD FOR UPLINK CHANNEL ACCESS TO UNLICENSED BAND IN WIRELESS COMMUNICATION SYSTEM AND APPARATUS FOR SAME

CROSS-REFERENCE TO RELATED APPLICATIONS

This application is a continuation of U.S. patent application Ser. No. 17/015,055 filed on Sep. 8, 2020, which is a continuation of U.S. patent application Ser. No. 16/138,936 filed on Sep. 21, 2018, issued as U.S. Pat. No. 10,805,950 dated Oct. 13, 2020, which is a continuation of International Patent Application No. PCT/KR2017/003280 filed on Mar. 27, 2017, which claims the priority to Korean Patent Application No. 10-2016-0036348 filed in the Korean Intellectual Property Office on Mar. 25, 2016, Korean Patent Application No. 10-2016-0039811 filed in the Korean Intellectual Property Office on Mar. 31, 2016, Korean Patent Application No. 10-2016-0079634 filed in the Korean Intellectual Property Office on Jun. 24, 2016, Korean Patent Application No. 10-2016-0088279 filed in the Korean Intellectual Property Office on Jul. 12, 2016, and Korean Patent Application No. 10-2016-0108045 filed in the Korean Intellectual Property Office on Aug. 25, 2016, the entire contents of which are incorporated herein by reference.

TECHNICAL FIELD

The present invention relates to a wireless communication system. Particularly, the present invention relates to a method for an uplink channel access to an unlicensed band in a wireless communication system and an apparatus for the same.

BACKGROUND ART

In recent years, with an explosive increase of mobile traffic due to the spread of smart devices, it has been difficult to cope with data usage which increases for providing a cellular communication service only by a conventional licensed frequency spectrum or LTE-licensed frequency band.

In such a situation, a scheme that uses an unlicensed (alternatively, unauthorized, non-licensed, or license unnecessary) frequency spectrum or LTE-Unlicensed frequency band (e.g., 2.4 GHz band, 5 GHz band, or the like) for providing the cellular communication service has been devised as a solution for a spectrum shortage problem.

However, unlike the licensed band in which a communication service provider secures an exclusive frequency use right through a procedure such as auction, or the like, in the unlicensed band, multiple communication facilities can be used simultaneously without limit when only a predetermined level of adjacent band protection regulation is observed. As a result, when the unlicensed band is used in the cellular communication service, it is difficult to guarantee communication quality at a level provided in the licensed band and an interference problem with a conventional wireless communication device (e.g., wireless LAN device) using the unlicensed band may occur.

Therefore, a research into a coexistence scheme with the conventional unlicensed band device and a scheme for efficiently sharing a radio channel needs to be preferentially made in order to settle an LTE technology in the unlicensed band. That is, a robust coexistence mechanism (RCM) needs to be developed in order to prevent a device using the LTE technology in the unlicensed band from influencing the conventional unlicensed band device.

DISCLOSURE

Technical Problem

The present invention has been made in an effort to provide a method for efficiently transmitting a signal in a wireless communication system, in particular, a cellular wireless communication system and an apparatus therefor. Further, the present invention has been made in an effort to provide a method for efficiently transmitting a signal in a specific frequency band (e.g., unlicensed band) and an apparatus therefor.

Technical objects desired to be achieved in the present invention are not limited to the aforementioned objects, and other technical objects not described above will be apparently understood by those skilled in the art from the following disclosure.

Technical Solution

An exemplary embodiment of the present invention provides a method for performing an uplink transmission to a base station through an unlicensed cell in a wireless communication system, the method including: receiving, from the base station, an uplink grant scheduling the uplink transmission on one or more subframes; and performing the uplink transmission on the one or more subframes using one of a first type channel access or a second type channel access indicated in the uplink grant, wherein a parameter for the first type channel access is determined according to a priority included in the uplink grant, and wherein when the uplink grant indicates the second type channel access, the priority is a priority used in a downlink channel access of the base station.

Another exemplary embodiment of the present invention provides a user equipment in a wireless communication system, the terminal including: a wireless communication module; and a processor, wherein the processor is configured to: receive, from a base station, an uplink gran scheduling the uplink transmission on one or more subframes, and perform the uplink transmission on the one or more subframes using one of a first type channel access or a second type channel access indicated in the uplink grant, wherein a parameter for the first type channel access is determined according to a priority included in the uplink grant, and wherein when the uplink grant indicates the second type channel access, the priority is a priority used in a downlink channel access of the base station.

Preferably, when the first type channel access is indicated for the uplink transmission in the uplink grant, the priority included in the uplink grant may be determined based on the uplink transmission. However, when the uplink grant indicates the second type channel access, the priority may be a priority of the downlink channel access used by the base station for transmitting the uplink grant.

More preferably, when the first type channel access is used in a particular subframe indicated as using the second type channel access in the uplink grant among the one or more subframes, the parameter for the first type channel access may be determined by using the priority used in a downlink channel access of the base station.

In addition, the parameter for the first type channel access may include, based on the priority, a parameter for determining a size of a contention window (CW) for the first type channel access and an uplink maximum channel occupancy time.

Furthermore, when a channel access in a particular subframe among the one or more subframes fails, the uplink transmission may be performed by using a channel access of a type indicated by the uplink grant on a next subframe of the particular subframe.

On the other hand, yet another exemplary embodiment of the present invention provides a method for transmitting, by a base station, an uplink grant for an uplink transmission through an unlicensed cell to a user equipment in a wireless communication system, the method including: scheduling the uplink transmission on one or more subframes to the user equipment, and transmitting an uplink grant indicating a channel access type for performing the uplink transmission, wherein the channel access type is one of a first type channel access or a second type channel access, wherein a parameter for the first type channel access is determined according to a priority included in the uplink grant, and wherein when the uplink grant indicates the second type channel access, the priority is a priority used in a downlink channel access of the base station.

In addition, still yet another exemplary embodiment of the present invention provides a base station in a wireless communication system, the base station including: a wireless communication module; and a processor, wherein the processor is configured to: schedule an uplink transmission on one or more subframes through an unlicensed cell, and transmit an uplink grant indicating a channel access type for performing the uplink transmission, wherein the channel access type is one of a first type channel access or a second type channel access, wherein a parameter for the first type channel access is determined according to a priority included in the uplink grant, and wherein when the uplink grant indicates the second type channel access, the processor sets the priority as a priority used in a downlink channel access of the base station.

In this case, when the uplink grant indicates the first type channel access, the priority included in the uplink grant may be determined based on the uplink transmission. In particular, the parameter for the first type channel access may comprise, based on the priority, a parameter for determining a size of a contention window (CW) for the first type channel access and an uplink maximum channel occupancy time.

Preferably, when the uplink grant indicates the second type channel access, the priority may be a priority of the downlink channel access used by the base station for transmitting the uplink grant.

Advantageous Effects

According to exemplary embodiments of the present invention, provided are a method for efficiently transmitting a signal in a wireless communication system, in particular, a cellular wireless communication system and an apparatus therefor. Further, provided are a method for efficiently performing channel access in a specific frequency band (e.g., unlicensed band) and an apparatus therefor.

Effects to be acquired in the present invention are not limited to the aforementioned effects, and other effects not described above will be apparently understood by those skilled in the art from the following disclosure.

DESCRIPTION OF DRAWINGS

In order to help understand the present invention, the accompanying drawings which are included as a part of the Detailed Description provide embodiments of the present invention and describe the technical matters of the present invention together with the Detailed Description.

DETAILED DESCRIPTION OF THE INVENTION

Terms used in the specification adopt general terms which are currently widely used as possible by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it intends to be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "equal to or more than" or "equal to or less than" based on a specific threshold may be appropriately substituted with "more than" or "less than", respectively in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a radio technology such as universal terrestrial radio access (UTRA) or CDMA2000. The TDMA may be implemented by a radio technology such as global system for mobile communications (GSM)/general packet radio service (GPRS)/enhanced data rates for GSM evolution (EDGE). The OFDMA may be implemented by a radio technology such as IEEE 802.11 (Wi-Fi), IEEE 802.16 (WiMAX), IEEE 802-20, evolved UTRA (E-UTRA), and the like. The UTRA is a part of a universal mobile telecommunication system (UMTS). $3^{rd}$ generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP LTE/LTE-A is primarily described for clear description, but technical spirit of the present invention is not limited thereto.

Figure 1:
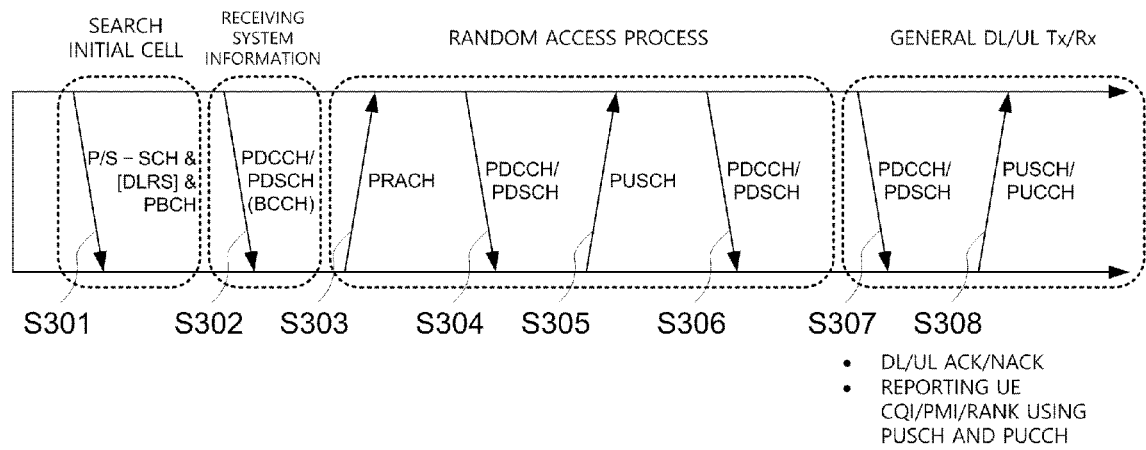
FIG. 1 illustrates physical channels used in a 3rd generation partnership project (3GPP) system and a general signal transmitting method using the physical channels.

FIG. 1 illustrates physical channels used in a 3GPP system and a general signal transmitting method using the physical channels. A user equipment receives information from a base station through downlink (DL) and the user equipment transmits information through uplink (UL) to the base station. The information transmitted/received between the base station and the user equipment includes data and various control information and various physical channels exist according to a type/purpose of the information transmitted/received between the base station and the user equipment.

When a power of the user equipment is turned on or the user equipment newly enters a cell, the user equipment performs an initial cell search operation including synchronization with the base station, and the like (S301). To this end, the user equipment receives a primary synchronization channel (P-SCH) and a secondary synchronization channel (S-SCH) from the base station to synchronize with the base station and obtain information including a cell ID, and the like. Thereafter, the user equipment receives a physical broadcast channel from the base station to obtain intra-cell broadcast information. The user equipment receives a downlink reference signal (DL RS) in an initial cell search step to verify a downlink channel state.

The user equipment that completes initial cell search receives a physical downlink control channel (PDCCH) and a physical downlink shared channel (PDSCH) depending on information loaded on the PDCCH to obtain more detailed system information (S302).

When there is no radio resource for initially accessing the base station or signal transmission, the user equipment may perform a random access procedure (RACH procedure) to the base station (S303 to S306). To this end, the user equipment may transmit a preamble through a physical random access channel (PRACH) (S303) and receive a response message to the preamble through the PDCCH and the PDSCH corresponding thereto (S304). In the case of a contention based RACH, a contention resolution procedure may be additionally performed.

Thereafter, the user equipment may receive the PDCCH/PDSCH (S307) and transmit a physical uplink shared channel (PUSCH)/physical uplink control channel (PUCCH) (S308) as a general procedure. The user equipment receives downlink control information (DCI) through the PDCCH. The DCI includes control information such as resource allocation information to the user equipment and a format varies depending on a use purpose. The control information which the user equipment transmits to the base station is designated as uplink control information (UCI). The UCI includes an acknowledgement/negative acknowledgement (ACK/NACK), a channel quality indicator (CQI), a precoding matrix index (PMI), a rank indicator (RI), and the like. The UCI may be transmitted through the PUSCH and/or PUCCH.

Figure 2:
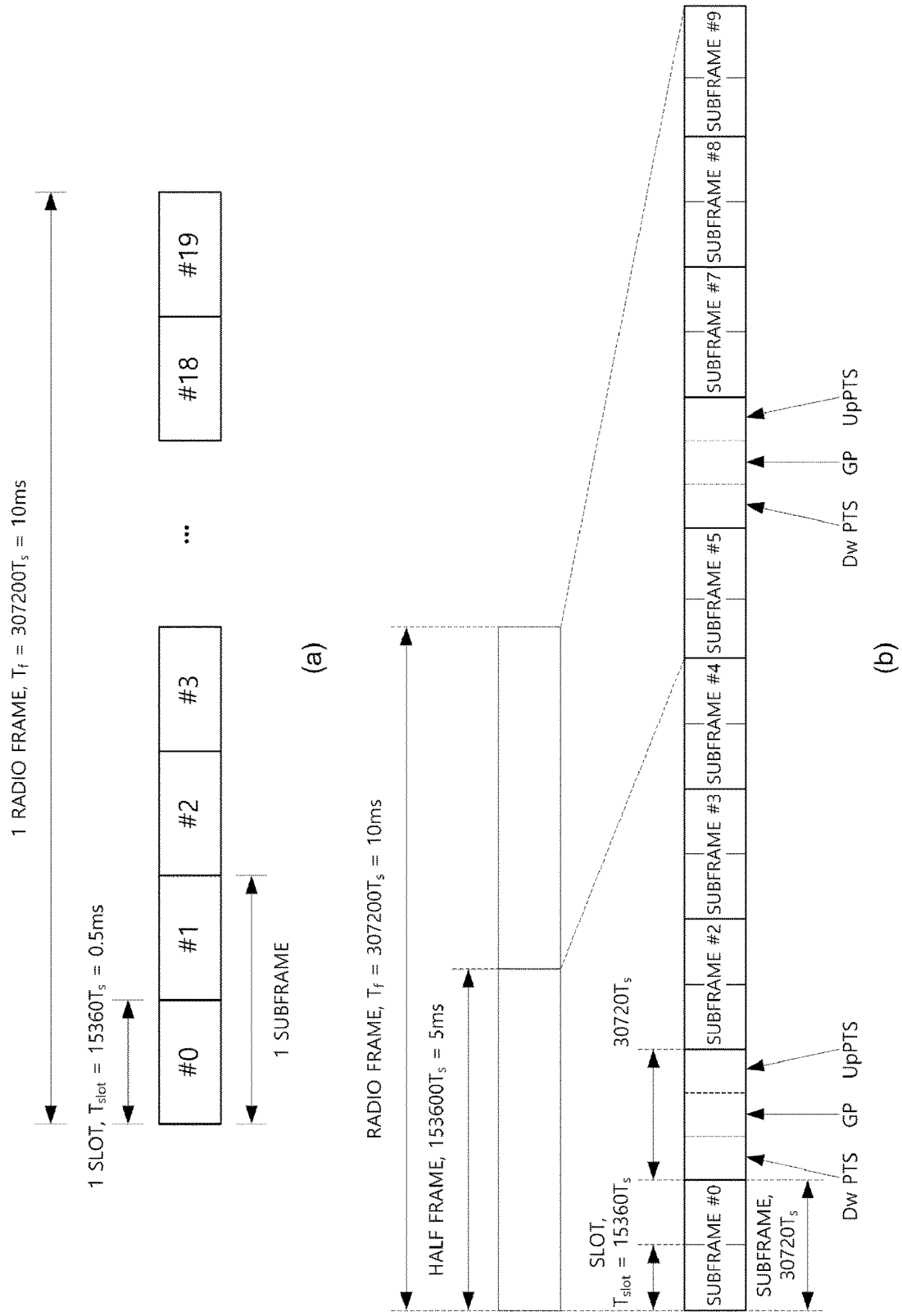
FIG. 2 illustrates one example of a radio frame structure used in a wireless communication system.

FIG. 2 illustrates one example of a radio frame structure used in a wireless communication system. FIG. 2A illustrates a frame structure for frequency division duplex (FDD) and FIG. 2B illustrates a frame structure for time division duplex (TDD).

Referring to FIG. 2, a radio frame may have a length of 10 ms (307200 Ts) and be constituted by 10 subframes (SFs). Ts represents a sampling time and is expressed as Ts=1/(2048*15 kHz). Each subframe may have a length of 1 ms and be constituted by 2 slots. Each slot has a length of 0.5 ms. A time for transmitting one subframe is defined as a transmission time interval (TTI). A time resource may be distinguished by radio frame numbers/indexes, subframe numbers/indexes #0 to #9, and slot numbers/indexes #0 to #19.

The radio frame may be configured differently according to a duplex mode. In an FDD mode, downlink transmission and uplink transmission are distinguished by a frequency and the radio frame includes only one of a downlink subframe and an uplink subframe with respect to a specific frequency band. In a TDD mode, the downlink transmission and the uplink transmission are distinguished by a time and the radio frame includes both the downlink subframe and the uplink subframe with respect to a specific frequency band.

Figure 3:
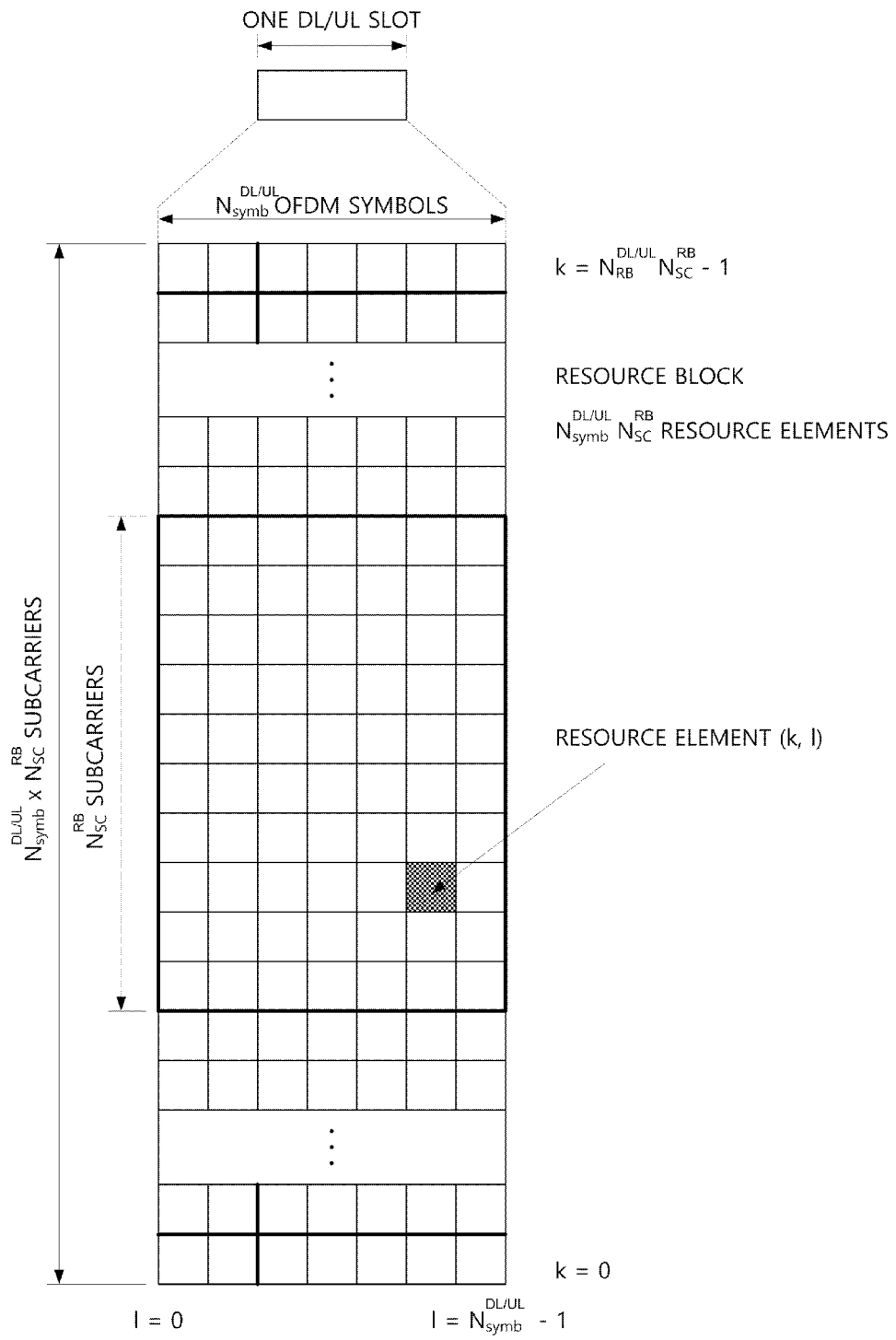
FIG. 3 illustrates one example of a downlink (DL)/uplink (UL) slot structure in the wireless communication system.

FIG. 3 illustrates a structure of a downlink/uplink slot.

Referring to FIG. 3, the slot includes a plurality of orthogonal frequency divisional multiplexing (OFDM) symbols in a time domain and a plurality of resource blocks (RBs) in a frequency domain. The OFDM symbol also means one symbol period. The OFDM symbol may be called an OFDMA symbol, a single carrier frequency division multiple access (SC-FDMA) symbol, or the like according to a multi-access scheme. The number of OFDM symbols included in one slot may be variously modified according to the length of a cyclic prefix (CP). For example, in the case of a normal CP, one slot includes 7 OFDM symbols and in the case of an extended CP, one slot includes 6 OFDM symbols. The RB is defined as $N^{DL/UL}_{symb}$ (e.g., 7) continuous OFDM symbols in the time domain and $N^{RB}_{sc}$ (e.g., 12) continuous subcarriers in the frequency domain. A resource constituted by one OFDM symbol and one subcarrier is referred to as a resource element (RE) or a tone. One RB is constituted by $N^{DL/UL}_{symb} * N^{RB}_{sc}$ resource elements.

The resource of the slot may be expressed as a resource grid constituted by $N^{DL/UL}_{RB} * N^{RB}_{sc}$ subcarriers and $N^{DL/UL}_{symb}$ OFDM symbols. Each RE in the resource grid is uniquely defined by an index pair (k, l) for each slot. k represents an index given with 0 to $N^{DL/UL}_{RB} * N^{RB}_{sc} - 1$ in the frequency domain and l represents an index given with 0 to $N^{DL/UL}_{symb} - 1$ in the time domain. Herein, $N^{DL}_{RB}$ represents the number of resource blocks (RBs) in the downlink slot and $N^{UL}_{RB}$ represents the number of RBs in the UL slot. $N^{DL}_{RB}$ and $N^{UL}_{RB}$ depend on a downlink transmission bandwidth and a uplink transmission bandwidth, respectively. $N^{DL}_{symb}$ represents the number of symbols in the downlink slot and $N^{UL}_{symb}$ represents the number of symbols in the UL slot. $N^{RB}_{sc}$ represents the number of subcarriers constituting one RB. One resource grid is provided per antenna port.

Figure 4:
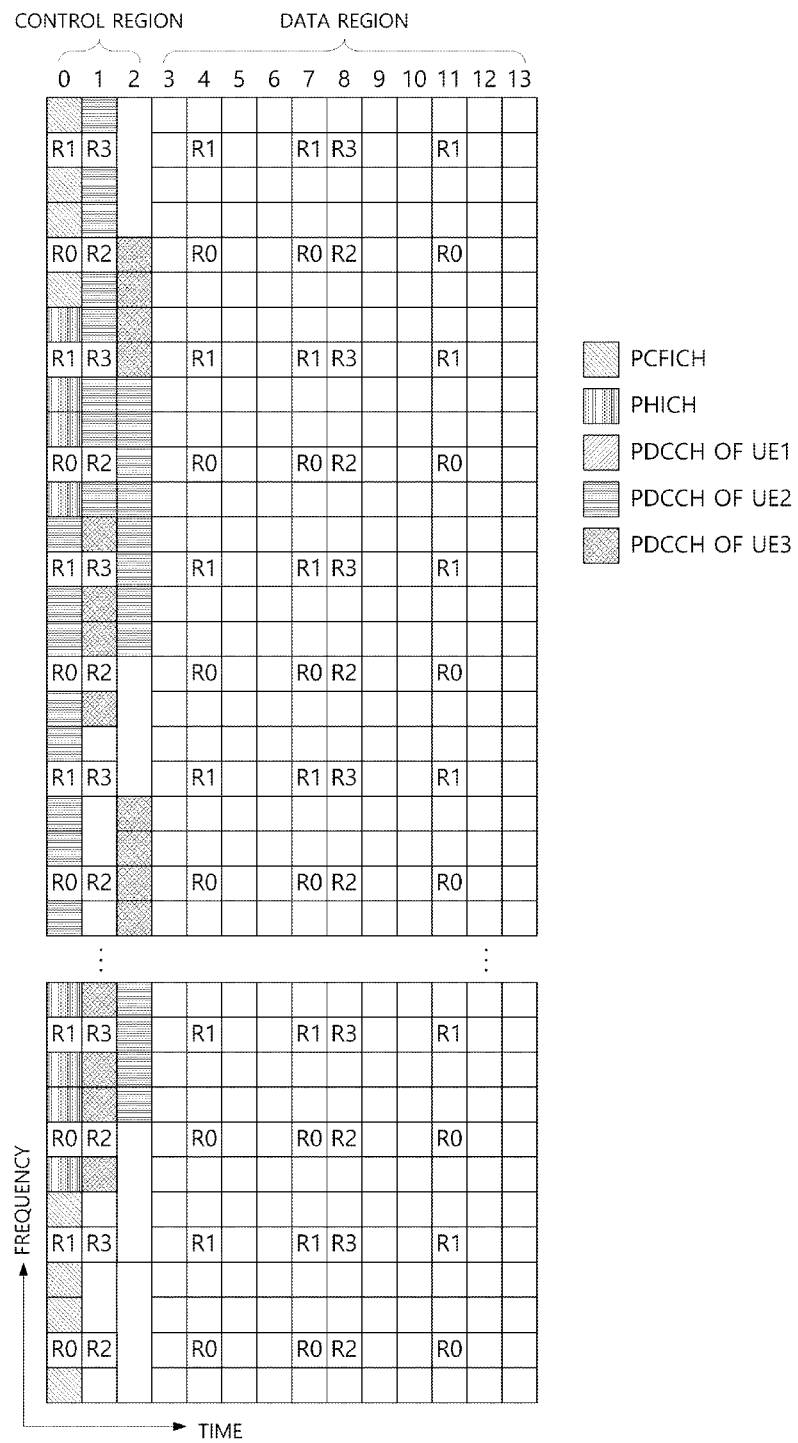
FIG. 4 illustrates a structure of a downlink subframe.

FIG. 4 illustrates a structure of a downlink subframe.

Referring to FIG. 4, the subframe may be constituted by 14 OFDM symbols. First 1 to 3 (alternatively, 2 to 4) OFDM symbols are used as a control region and the remaining 13 to 11 (alternatively, 12 to 10) OFDM symbols are used as a data region according to subframe setting. R1 to R4 represent reference signals for antenna ports 0 to 3. Control channels allocated to the control region include a physical control format indicator channel (PCFICH), a physical hybrid-ARQ indicator channel (PHICH), a physical downlink control channel (PDCCH), and the like. Data channels allocated to the data region include the PDSCH, and the like. When an enhanced PDCCH (EPDCCH) is set, the PDSCH and the EPDCCH are multiplexed by frequency division multiplexing (FDM) in the data region.

The PDCCH as the physical downlink control channel is allocated to first n OFDM symbols of the subframe. n as an integer of 1 (alternatively, 2) or more is indicated by the PCFICH. The PDCCH announces information associated with resource allocation of a paging channel (PCH) and a downlink-shared channel (DL-SCH) as transmission channels, an uplink scheduling grant, HARQ information, and the like to each user equipment or user equipment group. Data (that is, transport block) of the PCH and the DL-SCH are transmitted through the PDSCH. Each of the base station and the user equipment generally transmit and receive data through the PDSCH except for specific control information or specific service data.

Information indicating to which user equipment (one or a plurality of user equipments) the data of the PDSCH is transmitted, information indicating how the user equipments receive and decode the PDSCH data, and the like are transmitted while being included in the PDCCH/EPDCCH. For example, it is assumed that the PDCCH/EPDCCH is CRC-masked with a radio network temporary identity (RNTI) called "A" and information regarding data transmitted by using a radio resource (e.g., frequency location) called "B" and a DCI format called "C", that is, transmission format information (e.g., transport block size, modulation scheme, coding information, and the like) is transmitted through a specific subframe. In this case, a user equipment in the cell monitors the PDCCH/EPDCCH by using the RNTI information thereof and when one or more user equipments having the "A" RNTI are provided, the user equipments receive the PDCCH/EPDCCH and receive the PDSCH indicated by "B" and "C" through information on the received PDCCH/EPDCCH.

Figure 5:
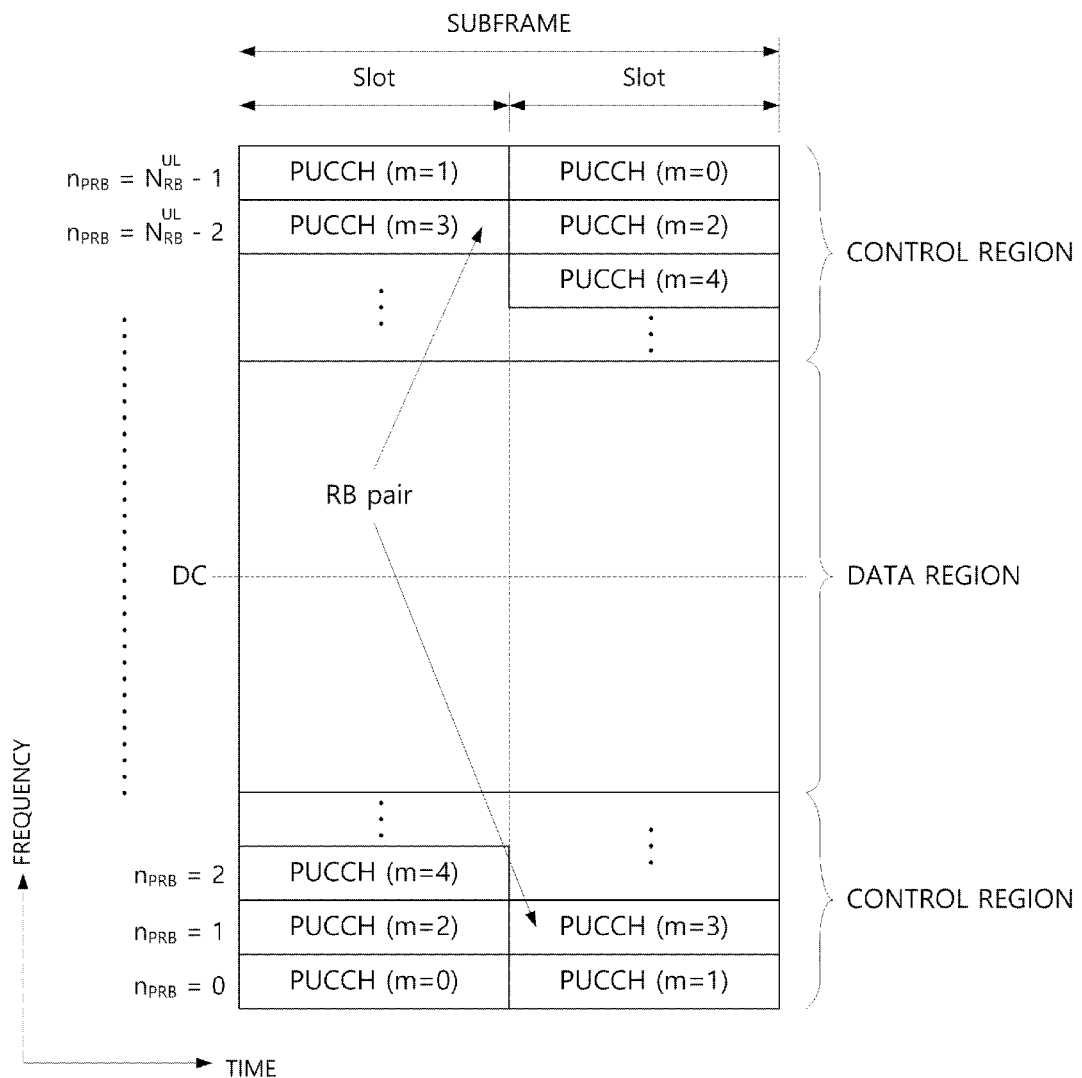
FIG. 5 illustrates a structure of an uplink subframe.

FIG. 5 illustrates a structure of an uplink subframe.

Referring to FIG. 5, the subframe may be divided into the control region and the data region in the frequency domain. The PUCCH is allocated to the control region and carries the UCI. The PUSCH is allocated to the data region and carries user data.

The PUCCH may be used to transmit the following control information.

Scheduling Request (SR): Information used to request a UL-SCH resource. The SR is transmitted by using an on-off keying (OOK) scheme.

HARQ-ACK: Response to the PDCCH and/or response to a downlink data packet (e.g., codeword) on the PDSCH. The codeword is an encoded format of the transport block. The HARQ-ACK indicates whether the PDCCH or PDSCH is successfully received. The HARQ-ACK response includes a positive ACK (simply, ACK), a negative ACK (NACK), discontinuous transmission (DTX), or the NACK/DTX. The DTX represents a case in which the user equipment misses the PDCCH (alternatively, semi-persistent scheduling (SPS) PDSCH) and the NACK/DTX means the NACK or DTX. The HARQ-ACK is mixedly used with the HARQ-ACK/NACK and the ACK/NACK.

Channel State Information (CSI): Feed-back information regarding the downlink channel. Multiple input multiple output (MIMO) related feed-back information includes the RI and the PMI.

Hereinafter, carrier aggregation will be described. The carrier aggregation means a method in which the wireless communication system uses a plurality of frequency blocks as one large logical frequency band in order to use a wider frequency band. When a whole system band is extended by the carrier aggregation, a frequency band used for communication with each user equipment is defined by a component carrier (CC) unit.

Figure 6:
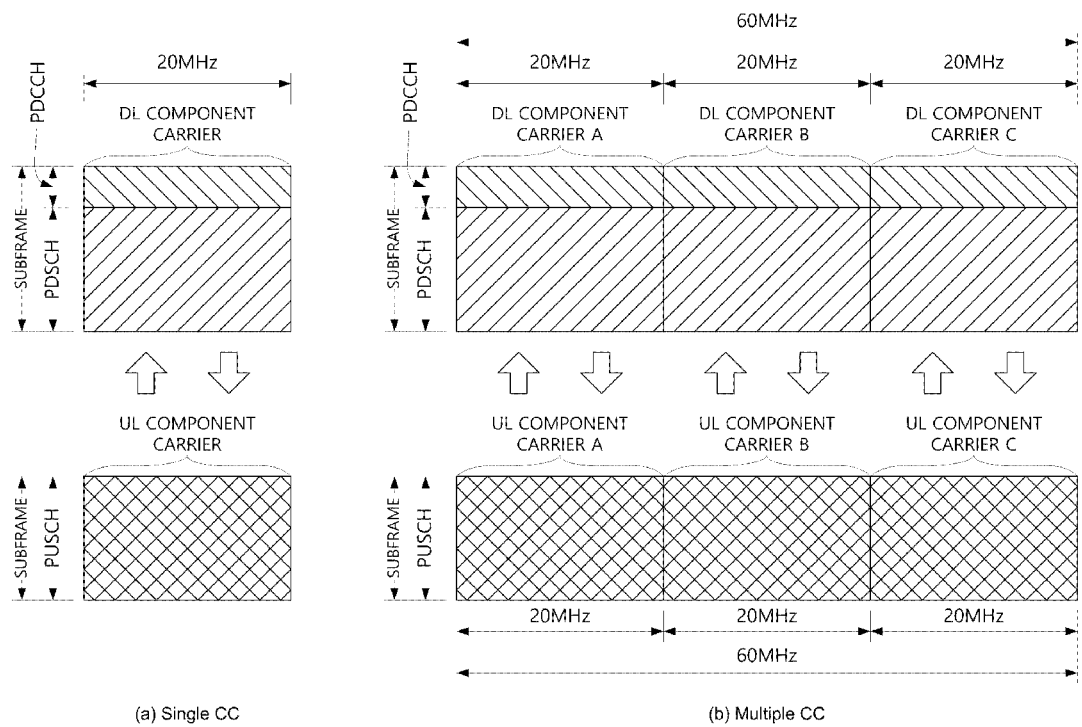
FIG. 6 is a diagram for describing single carrier communication and multi-carrier communication.

FIG. 6 is a diagram for describing single carrier communication and multi-carrier communication. FIG. 6(a) illustrates a subframe structure of a single carrier and FIG. 6(b) illustrates a subframe structure of multi-carriers which are carrier-aggregated.

Referring to FIG. 6(a), in a single carrier system, the base station and the user equipment perform data communication through one DL band and one UL band corresponding thereto. The DL/UL band is divided into a plurality of orthogonal subcarriers and each frequency band operates at one carrier frequency. In the FDD, the DL and UL bands operate at different carrier frequencies, respectively and in the TDD, the DL and UL bands operate at the same carrier frequency. The carrier frequency means a center frequency of the frequency band.

Referring to FIG. 6(b), the carrier aggregation is distinguished from an OFDM system that performs DL/UL communication in a base frequency band divided into a plurality of subcarriers by using one carrier frequency, in that the carrier aggregation performs DL/UL communication by using a plurality of carrier frequencies. Referring to FIG. 6(b), three 20 MHz CCs are gathered in each of the UL and the DL to support a bandwidth of 60 MHz. The CCs may be adjacent to each other or non-adjacent to each other in the frequency domain. For convenience, FIG. 6(b) illustrates a case in which a bandwidth of a UL CC and a bandwidth of a DL CC are the same as each other and symmetric to each other, but the bandwidths of the respective CCs may be independently decided. Further, asymmetric carrier aggregation in which the number of UL CCs and the number of DL CCs are different from each other is also available. The DL/UL CC(s) are independently allocated/configured for each user equipment and the DL/UL CC(s) allocated/configured to the user equipment are designated as serving UL/DL CC(s) of the corresponding user equipment.

The base station may activate some or all of serving CCs of the user equipment or deactivate some CCs. When the base station allocates the CC(s) to the user equipment, if the CC allocation to the user equipment is wholly reconfigured or if the user equipment does not hand over, at least one specific CC among the CC(s) configured with respect to the corresponding user equipment is not deactivated. A specific CC which is always activated is referred to as a primary CC (PCC) and a CC which the base station may arbitrarily activate/deactivate is referred to as a secondary CC (SCC). The PCC and the SCC may be distinguished based on the control information. For example, specific control information may be set to be transmitted/received only through a specific CC and the specific CC may be referred to as the PCC and remaining CC(s) may be referred to as SCC(s). The PUCCH is transmitted only on the PCC.

In 3GPP, a concept of the cell is used in order to manage the radio resource. The cell is defined as a combination of the DL resource and the UL resource, that is, a combination of the DL CC and the UL CC. The cell may be configured by the DL resource only or the combination of the DL resource and the UL resource. When the carrier aggregation is supported, a linkage between the carrier frequency of the DL resource (alternatively, DL CC) and the carrier frequency of the UL resource (alternatively, UL CC) may be indicated by system information. For example, the combination of the DL resource and the UL resource may be indicated by a system information block type 2 (SIB2) linkage. The carrier frequency means a center frequency of each cell or CC. A cell corresponding to the PCC is referred to as the primary cell (PCell) and a cell corresponding to the SCC is referred to as the secondary cell (SCell). A carrier corresponding to the PCell is a DL PCC in the downlink and a carrier corresponding to the PCell is a UL PCC in the uplink. Similarly, a carrier corresponding to the SCell is a DL SCC in the downlink and a carrier corresponding to the SCell is a UL SCC in the uplink. According to a user equipment capability, the serving cell(s) may be constituted by one PCell and 0 or more SCells. For a user equipment which is in an RRC_CONNECTED state, but does not have any configuration for the carrier aggregation or does not support the carrier aggregation, only one serving cell constituted by only the PCell is present.

Figure 7:
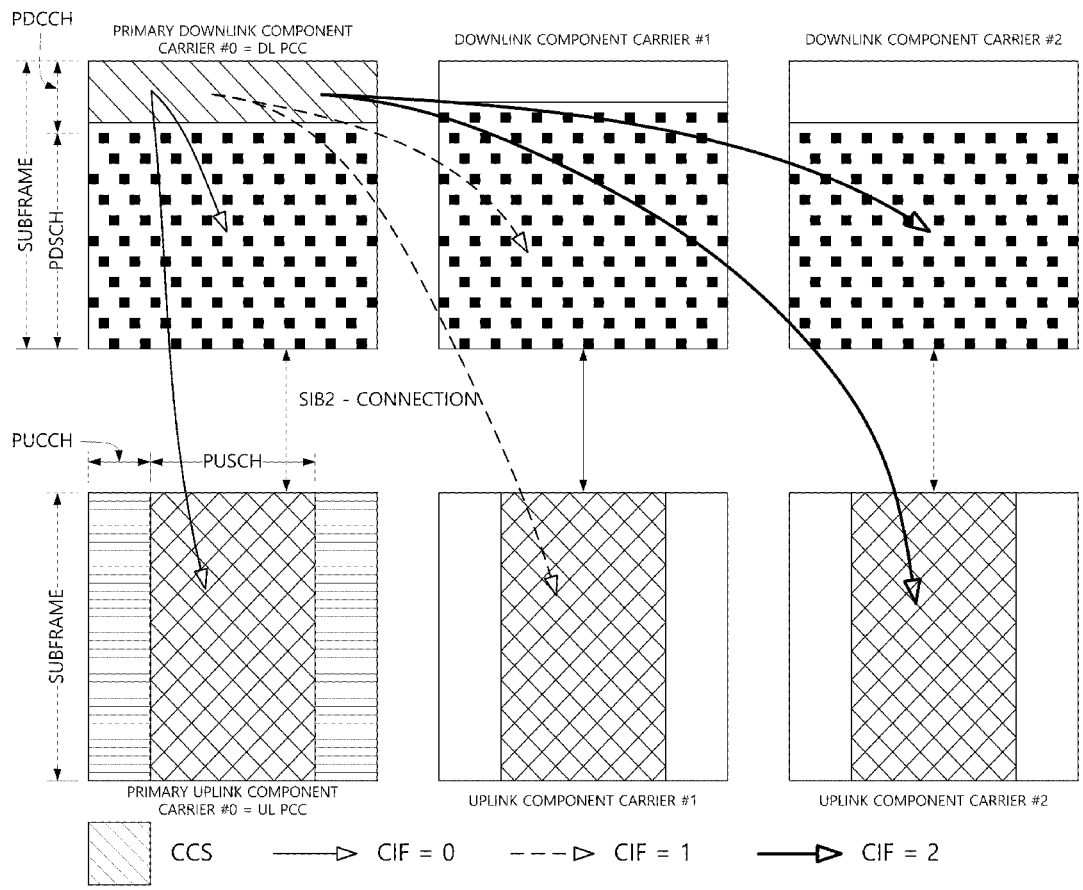
FIG. 7 illustrates an example in which a cross carrier scheduling technique is applied.

FIG. 7 illustrates an example in which cross carrier scheduling is applied. When the cross carrier scheduling is configured, a control channel transmitted through a first CC may schedule a data channel transmitted through the first CC or a second CC by using a carrier indicator field (CIF). The CIF is included in the DCI. In other words, a scheduling cell is configured, and a DL grant/UL grant transmitted in a PDCCH area of the scheduling cell schedules the PDSCH/PUSCH of a scheduled cell. That is, a search space for a plurality of component carriers is present in the PDCCH area of the scheduling cell. The PCell may be basically the scheduling cell and a specific SCell may be designated as the scheduling cell by an upper layer.

In FIG. 7, it is assumed that three DL CCs are aggregated. Herein, DL component carrier #0 is assumed as the DL PCC (alternatively, PCell) and DL component carrier #1 and DL component carrier #2 are assumed as the DL SCC (alternatively, SCell). Further, it is assumed that the DL PCC is set as a PDCCH monitoring CC. When the CIF is disabled, the respective DL CCs may transmit only the PDCCH that schedules the PDSCH thereof without the CIF according to an LTE PDCCH rule (non-cross carrier scheduling or self-carrier scheduling). On the contrary, when the CIF is enabled by UE-specific (alternatively, UE-group-specific or cell-specific) upper layer signaling, a specific CC (e.g., DL PCC) may transmit the PDCCH scheduling the PDSCH of DL CC A and the PDCCH scheduling the PDSCH of another CC by using the CIF (cross-carrier scheduling). On the contrary, in another DL CC, the PDCCH is not transmitted.

Figure 8:
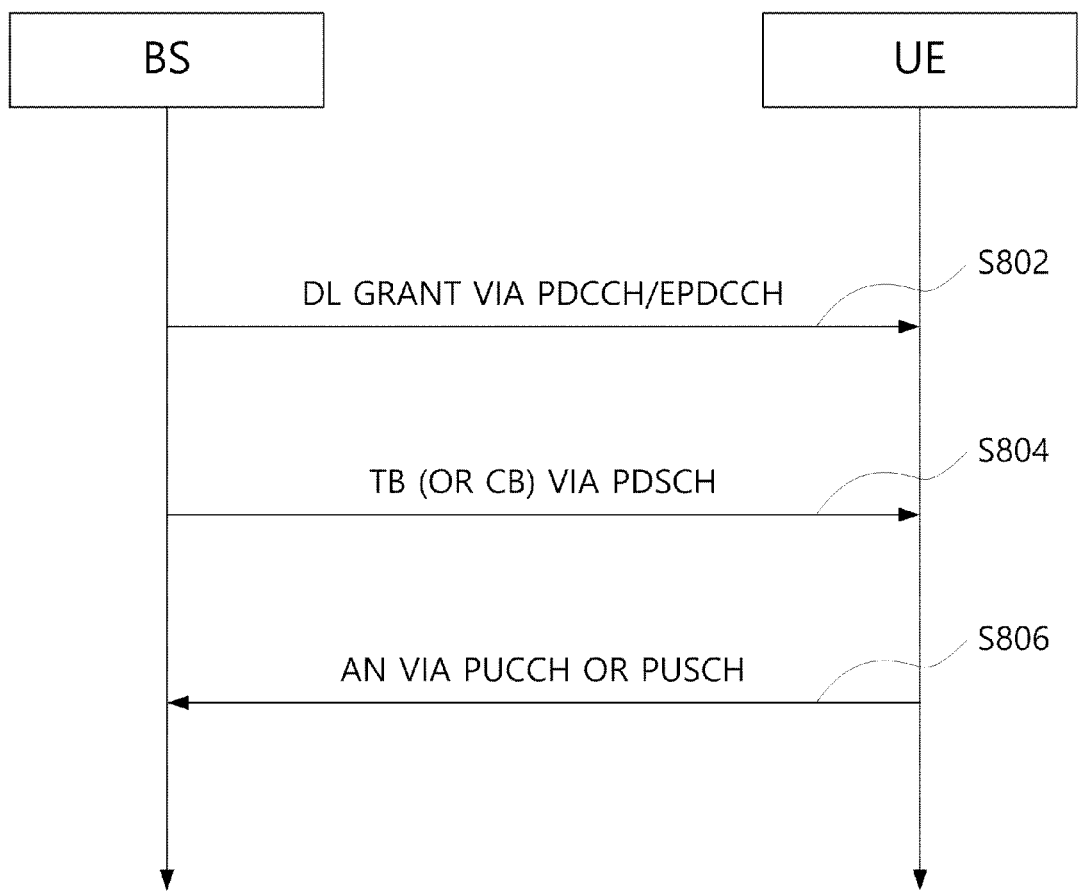
FIG. 8 illustrates an acknowledgement/negative acknowledgement (ACK/NACK (A/N)) transmitting process in a single cell situation.

FIG. 8 illustrates an ACK/NACK (A/N) transmitting process in a single cell situation. The ACK/NACK is fed back to (i) the PDSCH scheduled by the PDCCH, (ii) the PDSCH (that is, SPS PDSCH) without the PDCCH corresponding to the PDSCH, and (iii) the PDCCH indicating SPS release. In FIG. 8, a process of transmitting the ACK/NACK to (i) the PDSCH is illustrated. The PDCCH includes the EPDCCH.

Referring to FIG. 8, the user equipment receives the PDCCH (alternatively, EPDCCH) in subframe #n−k (S802) and receive the PDSCH indicated by the PDCCH in the same subframe (S804). The PDCCH transmits the scheduling information (that is, DL grant) and the PDSCH transmits one or a plurality of (e.g., two) transport blocks (TBs) (alternatively, codeword (CW)) according to a transmission mode. Thereafter, the user equipment may transmit the ACK/NACK for the PDSCH (that is, transport block) in subframe #n (S806). ACK/NACK 1 bit may be transmitted in response to a single transport block and ACK/NACK 2 bits may be transmitted in response to two transport blocks. The ACK/NACK is basically transmitted through the PUCCH, but when the PUSCH is transmitted in subframe #n, the ACK/NACK is transmitted through the PUSCH. k represents a time interval between the downlink subframe and the uplink subframe. In the FDD, k=4 and in the TDD, k may be given by a downlink association set index (DASI). The ACK/NACK means the HARQ-ACK. The HARQ-ACK response includes ACK, NACK, DTX, and NACK/DTX.

When a plurality of cells are configured for the user equipment, ACK/NACK information may be transmitted by using PUCCH format 3 or a channel selection scheme based on PUCCH format 1b.

An ACK/NACK payload for PUCCH format 3 is configured for each cell and thereafter, concatenated according to a cell index order. The ACK/NACK payload is configured with respect to all cells configured to the user equipment regardless of actual data transmission in each cell. Each bit in the ACK/NACK payload indicates HARQ-ACK feedback for the corresponding transport block (alternatively, codeword). The HARQ/ACK feed-back indicates ACK or NACK, and DTX is processed as the NACK. The NACK and the DTX have the same HARQ-ACK feed-back value. If necessary, the base station may distinguish the NACK and the DTX by using information on the control channel which the base station transmits to the user equipment.

The channel selection scheme based on the PUCCH format 1b may be set for transmitting the ACK/NACK when two cells are aggregated. In the channel selection scheme based on the PUCCH format 1b, ACK/NACK responses to the plurality of transport blocks (alternatively, codewords) are identified by a combination of a PUCCH resource index and a bit value.

Figure 9:
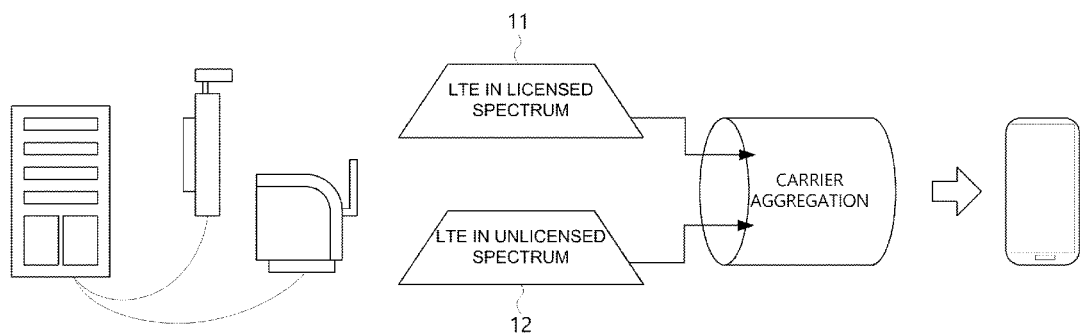
FIG. 9 illustrates a licensed assisted access (LAA) service environment.

FIG. 9 illustrates a licensed assisted access (LAA) service environment.

Referring to FIG. 9, a service environment may be provided to a user, in the service environment, an LTE technology (11) in a conventional licensed band and LTE-unlicensed (LTE-U) or LAA which is an LTE technology (12) in an unlicensed band, which has been actively discussed may be connected to each other. For example, the LTE technology (11) in the licensed band and the LTE technology (12) in the unlicensed band in the LAA environment may be integrated by using a technology such as carrier aggregation, or the like, which may contribute to extension of a network capacity. Further, in an asymmetric traffic structure in which the amount of downlink data is more than that of uplink data, the LAA may provide an optimized LTE service according to various requirements or environments. For convenience, the LTE technology in the licensed (alternatively, authorized or permitted) band is referred to as LTE-licensed (LTE-L) and the LTE technology in the unlicensed (alternatively, unauthorized, non-licensed, license-unnecessary) band is referred to as LTE-unlicensed (LTE-U) or LAA.

Figure 10:
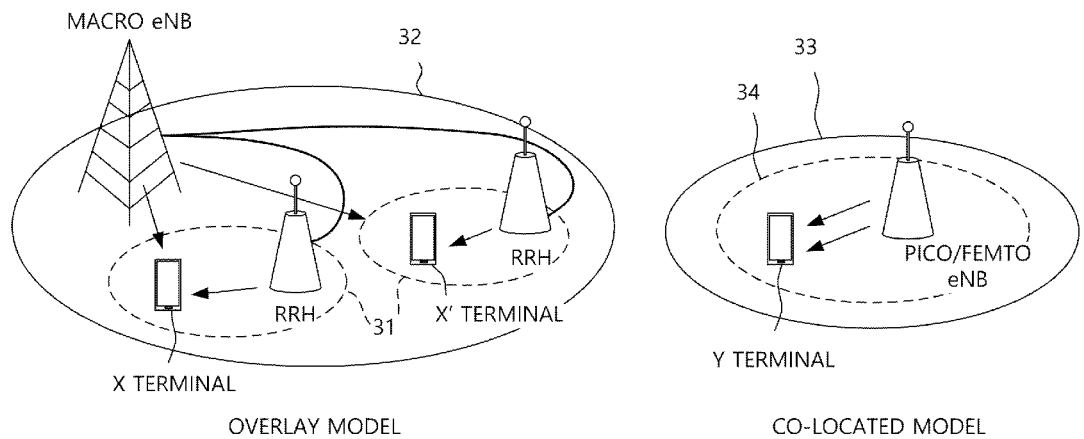
FIG. 10 illustrates a layout scenario of a user equipment and a base station in an LAA service environment.

FIG. 10 illustrates a layout scenario of a user equipment and a base station in an LAA service environment. A frequency band targeted by the LAA service environment has a short wireless communication reach distance due to a high-frequency characteristic. By considering this, the layout scenario of the user equipment and the base station in an environment in which the conventional LTE-L service and the LAA service coexist may be an overlay model and a co-located model.

In the overlay model, a macro base station may perform wireless communication with an X UE and an X' UE in a macro area (32) by using a licensed carrier and be connected with multiple radio remote heads (RRHs) through an X2 interface. Each RRH may perform wireless communication with an X UE or an X' UE in a predetermined area (31) by using an unlicensed carrier. The frequency bands of the macro base station and the RRH are different from each other not to interfere with each other, but data needs to be rapidly exchanged between the macro base station and the RRH through the X2 interface in order to use the LAA service as an auxiliary downlink channel of the LTE-L service through the carrier aggregation.

In the co-located model, a pico/femto base station may perform the wireless communication with a Y UE by using both the licensed carrier and the unlicensed carrier. However, it may be limited that the pico/femto base station uses both the LTE-L service and the LAA service to downlink transmission. A coverage (33) of the LTE-L service and a coverage (34) of the LAA service may be different according to the frequency band, transmission power, and the like.

When LTE communication is performed in the unlicensed band, conventional equipments (e.g., wireless LAN (Wi-Fi) equipments) which perform communication in the corresponding unlicensed band may not demodulate an LTE-U message or data and determine the LTE-U message or data as a kind of energy to perform an interference avoidance operation by an energy detection technique. That is, when energy corresponding to the LTE-U message or data is lower than −62 dBm, the wireless LAN equipments may perform communication by disregarding the corresponding message or data. As a result, that user equipment which performs the LTE communication in the unlicensed band may be frequently interfered by the wireless LAN equipments.

Therefore, a specific frequency band needs to be allocated or reserved for a specific time in order to effectively implement an LTE-U technology/service. However, since peripheral equipments which perform communication through the unlicensed band attempt access based on the energy detection technique, there is a problem in that an efficient LTE-U service is difficult. Therefore, a research into a coexistence scheme with the conventional unlicensed band device and a scheme for efficiently sharing a radio channel needs to be preferentially made in order to settle the LTE-U technology. That is, a robust coexistence mechanism in which the LTE-U device does not influence the conventional unlicensed band device needs to be developed.

Figure 11:
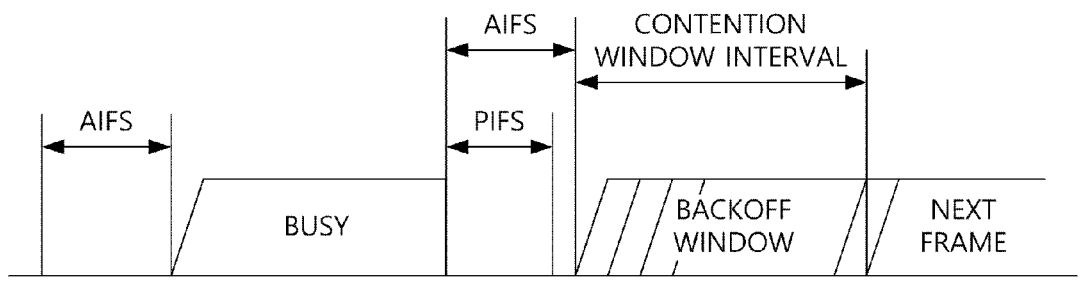
FIG. 11 illustrates a communication scheme that operates in an unlicensed band in the related art.

FIG. 11 illustrates a communication scheme (e.g., wireless LAN) that operates in an unlicensed band in the related art. Since most devices that operate in the unlicensed band operate based on listen-before-talk (LBT), a clear channel assessment (CCA) technique that senses a channel before data transmission is performed.

Referring to FIG. 11, a wireless LAN device (e.g., AP or STA) checks whether the channel is busy by performing carrier sensing before transmitting data. When a predetermined strength or more of radio signal is sensed in a channel to transmit data, it is determined that the corresponding channel is busy and the wireless LAN device delays the access to the corresponding channel. Such a process is referred to as clear channel evaluation and a signal level to decide whether the signal is sensed is referred to as a CCA threshold. Meanwhile, when the radio signal is not sensed in the corresponding channel or a radio signal having a strength smaller than the CCA threshold is sensed, it is determined that the channel is idle.

When it is determined that the channel is idle, a terminal having data to be transmitted performs a back-off procedure after a defer period (e.g., arbitration interframe space (AIFS), PCF IFS (PIFS), or the like). The defer period means a minimum time when the terminal needs to wait after the channel is idle. The back-off procedure allows the terminal to further wait for a predetermined time after the defer period. For example, the terminal stands by while decreasing a slot time for slot times corresponding to a random number allocated to the terminal in the contention window (CW) during the channel is in an idle state, and a terminal that completely exhausts the slot time may attempt to access the corresponding channel.

When the terminal successfully accesses the channel, the terminal may transmit data through the channel. When the data is successfully transmitted, a CW size (CWS) is reset to an initial value (CWmin). On the contrary, when the data is unsuccessfully transmitted, the CWS increases twice. As a result, the terminal is allocated with a new random number within a range which is twice larger than a previous random number range to perform the back-off procedure in a next CW. In the wireless LAN, only an ACK is defined as receiving response information to the data transmission. Therefore, when the ACK is received with respect to the data transmission, the CWS is reset to the initial value and when feed-back information is not received with respect to the data transmission, the CWS increases twice.

As described above, since most communications in the unlicensed band in the related art operate based on the LBT, the LTE also considers the LBT in the LAA for coexistence with the conventional device. In detail, in the LTE, the channel access method on the unlicensed band may be divided into 4 following categories according to the presence/an application scheme of the LBT.

(1) Category 1: No LBT
An LBT procedure by a Tx entity is not performed.
(2) Category 2: LBT without random back-off
A time interval in which the channel needs to be sensed in an idle state before the Tx entity performs a transmission on the channel is decided. The random back-off is not performed. This may be referred to as the second type channel access.
(3) Category 3: LBT with random back-off with a CW of fixed size
LBT method that performs random back-off by using a CW of a fixed size. The Tx entity has a random number N in the CW and the CW size is defined by a minimum/maximum value of N. The CW size is fixed. The random number N is used to decide the time interval in which the channel needs to be sensed in an idle state before the Tx entity performs a transmission on the channel.
(4) Category 4: LBT with random back-off with a CW of variable size
LBT method that performs the random back-off by using a CW of a variable size. The Tx entity has the random number N in the CW and the CW size is defined by the minimum/maximum value of N. The Tx entity may change the CW size at the time of generating the random number N. The random number N is used to decide the time interval in which the channel needs to be sensed in an idle state before the Tx entity performs a transmission on the channel. This may be referred to as the first type channel access.

Figure 12:
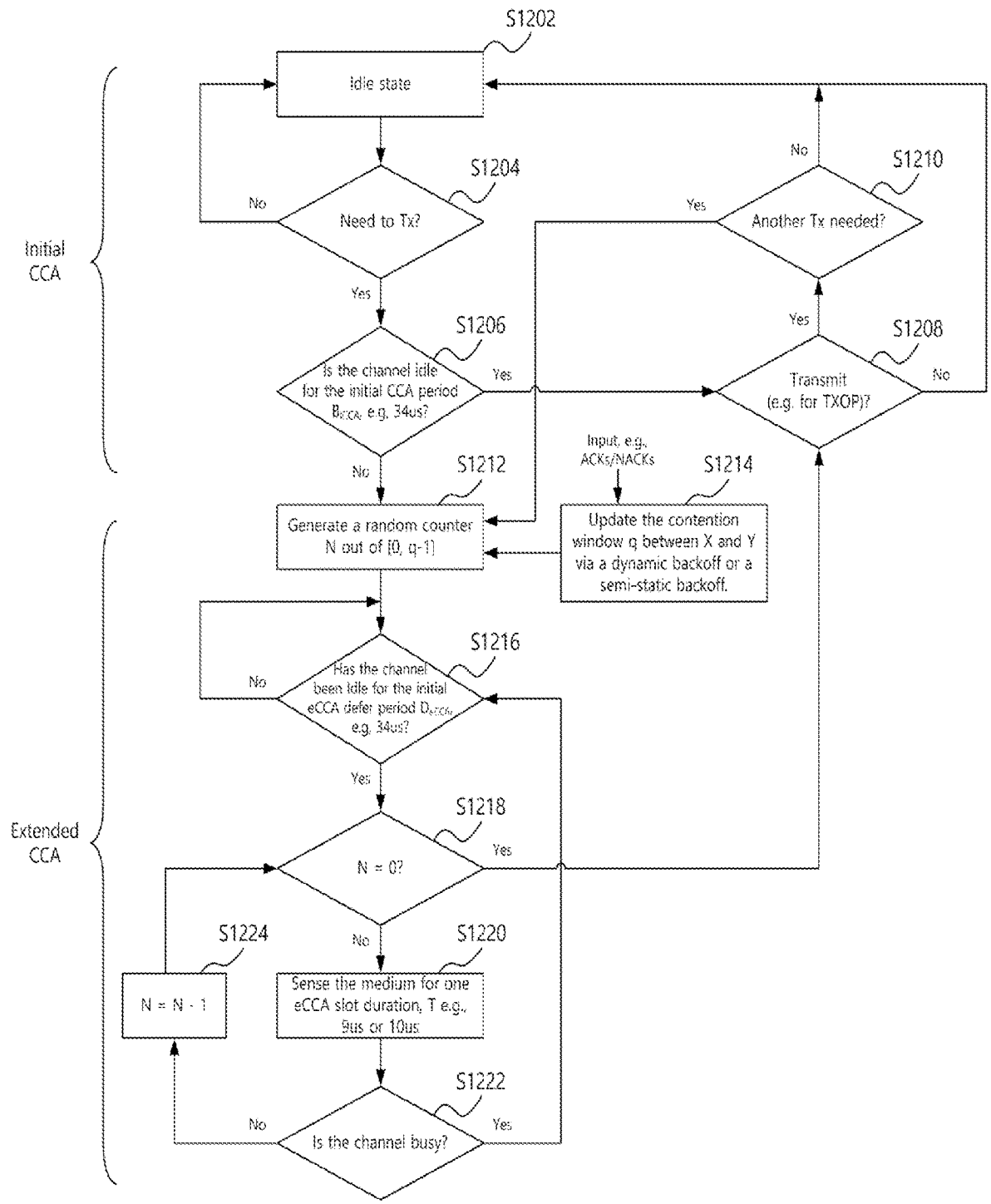
FIGS. 12 and 13 illustrate a listen-before-talk (LBT) process for downlink transmission.
Figure 13:
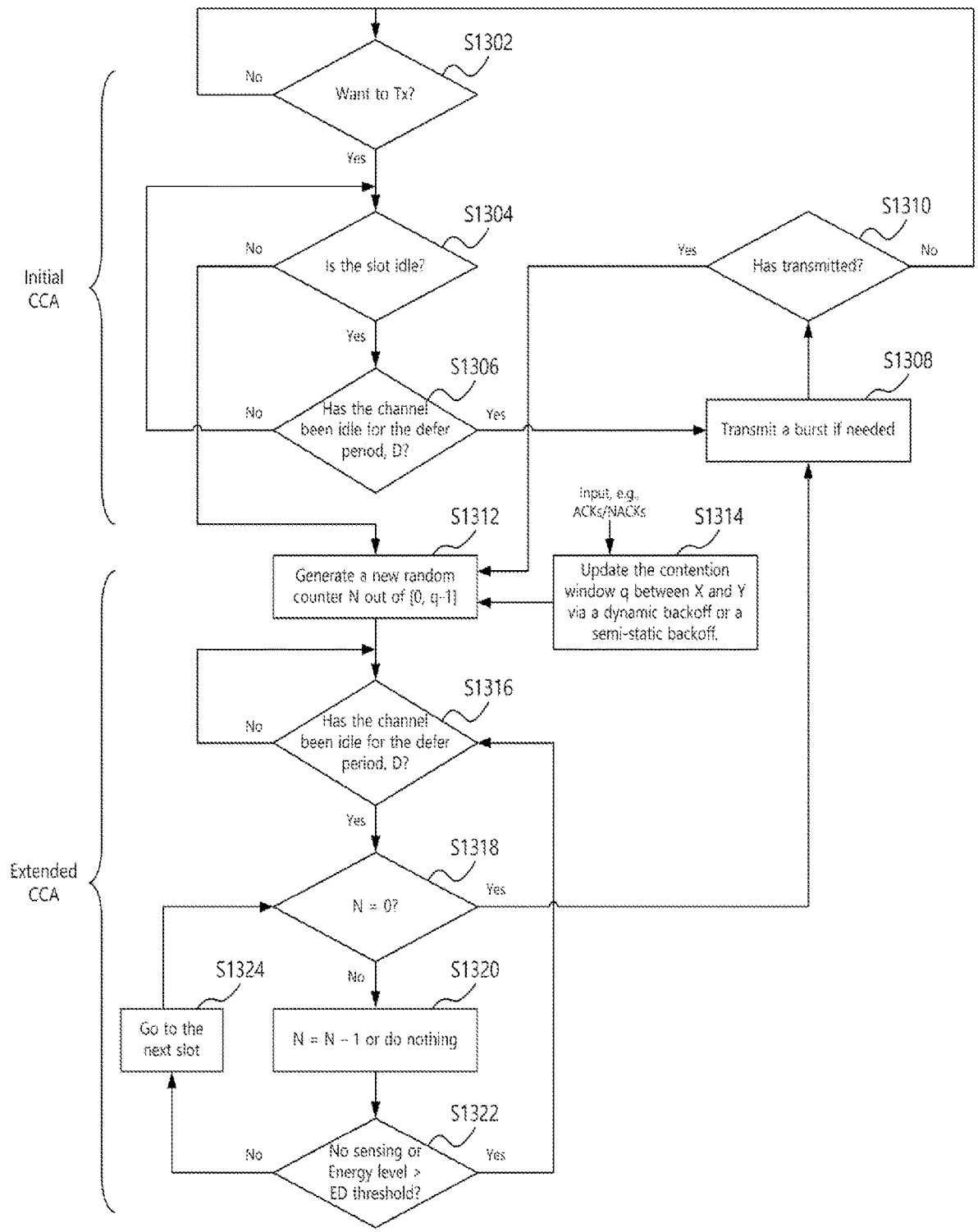

FIG. 12 and FIG. 13 illustrate a downlink transmission process based on the category 4 LBT. The category 4 LBT may be used to guarantee fair channel access with Wi-Fi. Referring to FIG. 12 and FIG. 13, the LBT process includes initial CCA (ICCA) and extended CCA (ECCA). In the ICCA, the random back-off is not performed and in the ECCA, the random back-off is performed by using the CW of the variable size. The ICCA is applied to the case in which the channel is idle when signal transmission is required and the ECCA is applied to the case in which the channel is busy when the signal transmission is required or downlink transmission is performed just before.

Referring to FIG. 12, a downlink transmitting process based on the category 4 LBT, that is, the first type channel access may be performed as follows.

Initial CCA

S1202: The base station verifies that the channel is idle.

S1204: The base station verifies whether the signal transmission is required. When the signal transmission is not required, the process returns to S1202 and when the signal transmission is required, the process proceeds to S1206.

S1206: The base station verifies whether the channel is idle for an ICCA defer period ($B_{CCA}$). The ICCA defer period is configurable. As an implementation example, the ICCA defer period may be constituted by an interval of 16 μs and n consecutive CCA slots. Herein, n may be a positive integer and one CCA slot interval may be 9 μs. The number of CCA slots may be configured differently according to a QoS class. The ICCA defer period may be set to an appropriate value by considering a defer period (e.g., DIFS or AIFS) of Wi-Fi. For example, the ICCA defer period may be 34 us. When the channel is idle for the ICCA defer period, the base station may perform the signal transmitting process (S1208). When it is determined that the channel is busy during the ICCA defer period, the process proceeds to S1212 (ECCA).

S1208: The base station may perform the signal transmitting process. When the signal transmission is not performed, the process proceeds to S1202 (ICCA) and when the signal transmission is performed, the process proceeds to S1210. Even in the case where a back-off counter N reaches 0 in S1218 and S1208 is performed, when the signal transmission is not performed, the process proceeds to S1202 (ICCA) and when the signal transmission is performed, the process proceeds to S1210.

S1210: When additional signal transmission is not required, the process proceeds to S1202 (ICCA) and when the additional signal transmission is required, the process proceeds to S1212 (ECCA).

Extended CCA

S1212: The base station generates the random number N in the CW. N is used as a counter during the back-off process and generated from [0, q−1]. The CW may be constituted by q ECCA slots and an ECCA slot size may be 9 μs or 10 μs. The CW size (CWS) may be defined as q and be variable in S1214. Thereafter, the base station proceeds to S1216.

S1214: The base station may update the CWS. The CWS q may be updated to a value between X and Y. The X and Y values are configurable parameters. CWS update/adjustment may be performed whenever N is generated (dynamic back-off) and semi-statically performed at a predetermined time interval (semi-static back-off). The CWS may be updated/adjusted based on exponential back-off or binary back-off. That is, the CWS may be updated/adjusted in the form of the square of 2 or the multiple of 2. In association with PDSCH transmission, the CWS may be updated/adjusted based on feed-back/report (e.g., HARQ ACK/NACK) of the user equipment or updated/adjusted based on base station sensing.

S1216: The base station verifies whether the channel is idle for an ECCA defer period (DeCCA). The ECCA defer period is configurable. As an implementation example, the ECCA defer period may be constituted by an interval of 16 μs and n consecutive CCA slots. Herein, n may be a positive integer and one CCA slot interval may be 9 μs. The number of CCA slots may be configured differently according to the QoS class. The ECCA defer period may be set to the appropriate value by considering the defer period (e.g., DIFS or AIFS) of Wi-Fi. For example, the ECCA defer period may be 34 us. When the channel is idle for the ECCA defer period, the base station proceeds to S1218. When it is determined that the channel is busy during the ECCA defer period, the base station repeats S1216.

S1218: The base station verifies whether N is 0. When N is 0, the base station may perform the signal transmitting process (S1208). In this case, (N=0), the base station may not immediately perform transmission and performs CCA check for at least one slot to continue the ECCA process. When N is not 0 (that is, N>0), the process proceeds to S1220.

S1220: The base station senses the channel during one ECCA slot interval (T). The ECCA slot size may be 9 μs or 10 μs and an actual sensing time may be at least 4 μs.

S1222: When it is determined that the channel is idle, the process proceeds to S1224. When it is determined that the channel is busy, the process returns to S1216. That is, one ECCA defer period is applied again after the channel is idle and N is not counted during the ECCA defer period.

S1224: N is decreased by 1 (ECCA countdown).

FIG. 13 is substantially the same as/similar to the transmitting process of FIG. 12 and is different from FIG. 12 according to an implementation scheme. Therefore, detailed matters may be described with reference to contents of FIG. 12.

S1302: The base station verifies whether the signal transmission is required. When the signal transmission is not required, S1302 is repeated and when the signal transmission is required, the process proceeds to S1304.

S1304: The base station verifies whether the slot is idle. When the slot is idle, the process proceeds to S1306 and when the slot is busy, the process proceeds to S1312 (ECCA). The slot may correspond to the CCA slot in FIG. 12.

S1306: The base station verifies whether the channel is idle for a defer period (D). D may correspond to the ICCA defer period in FIG. 12. When the channel is idle for the defer period, the base station may perform the signal transmitting process (S1308). When it is determined that the channel is busy during the defer period, the process proceeds to S1304.

S1308: The base station may perform the signal transmitting process if necessary.

S1310: When the signal transmission is not performed, the process proceeds to S1302 (ICCA) and when the signal transmission is performed, the process proceeds to S1312 (ECCA). Even in the case where the back-off counter N reaches 0 in S1318 and S1308 is performed, when the signal transmission is not performed, the process proceeds to S1302 (ICCA) and when the signal transmission is performed, the process proceeds to S1312 (ECCA).

Extended CCA

S1312: The base station generates the random number N in the CW. N is used as the counter during the back-off process and generated from [0, q−1]. The CW size (CWS) may be defined as q and be variable in S1314. Thereafter, the base station proceeds to S1316.

S1314: The base station may update the CWS. The CWS q may be updated to the value between X and Y. The X and Y values are configurable parameters. CWS update/adjustment may be performed whenever N is generated (dynamic back-off) and semi-statically performed at a predetermined time interval (semi-static back-off). The CWS may be updated/adjusted based on exponential back-off or binary back-off. That is, the CWS may be updated/adjusted in the form of the square of 2 or the multiple of 2. In association with PDSCH transmission, the CWS may be updated/adjusted based on feed-back/report (e.g., HARQ ACK/NACK) of the user equipment or updated/adjusted based on base station sensing.

S1316: The base station verifies whether the channel is idle for the defer period (D). D may correspond to the ECCA defer period in FIG. 12. D in S1306 and D in S1316 may be the same as each other. When the channel is idle for the defer period, the base station proceeds to S1318. When it is determined that the channel is busy during the defer period, the base station repeats S1316.

S1318: The base station verifies whether N is 0. When N is 0, the base station may perform the signal transmitting process (S1308). In this case, (N=0), the base station may not immediately perform transmission and performs CCA check during at least one slot to continue the ECCA process. When N is not 0 (that is, N>0), the process proceeds to S1320.

S1320: The base station selects one of an operation of decreasing N by 1 (ECCA count-down) and an operation of not decreasing N (self-defer). The self-defer operation may be performed according to implementation/selection of the base station and the base station does not perform sensing for energy detection and not perform even ECCA countdown in the self-defer.

S1322: The base station may select one of the operation not performing sensing for energy detection and the energy detecting operation. When the sensing for the energy detection is not performed, the process proceeds to S1324. When the energy detecting operation is performed, if an energy level is equal to or lower than an energy detection threshold (that is, idle), the process proceeds to S1324. If the energy level is higher than the energy detection threshold (that is, busy), the process returns to S1316. That is, one defer period is applied again after the channel is idle and N is not counted during the defer period.

S1324: The process proceeds to S1318.

Figure 14:
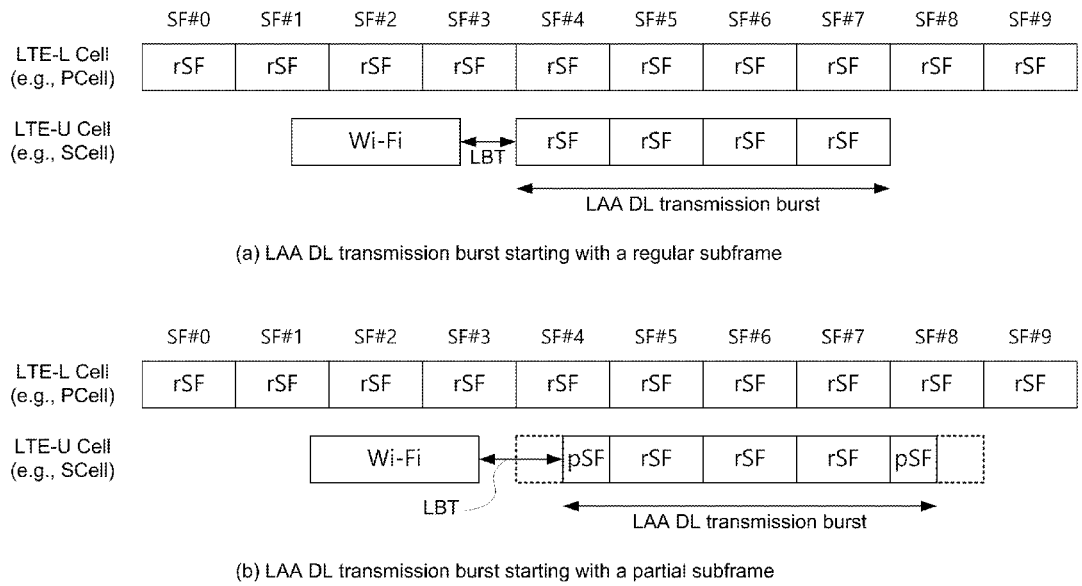
FIG. 14 illustrates downlink transmission in an unlicensed band.

FIG. 14 illustrates an example in which a base station performs downlink transmission in an unlicensed band. The base station may aggregate cells (for convenience, LTE-L cell) of one or more licensed bands and cells (for convenience, LTE-U cell) of one or more unlicensed bands. In FIG. 14, a case in which one LTE-L cell and one LTE-U cell are aggregated for communication with the user equipment is assumed. The LTE-L cell may be the PCell and the LTE-U cell may be the SCell. In the LTE-L cell, the base station may exclusively use the frequency resource and perform an operation depending on LTE in the related art. Therefore, all of the radio frames may be constituted by regular subframes (rSF) having a length of 1 ms (see FIG. 2) and the downlink transmission (e.g., PDCCH and PDSCH) may be performed every subframe (see FIG. 1). Meanwhile, in the LTE-U cell, the downlink transmission is performed based on the LBT for coexistence with the conventional device (e.g., Wi-Fi device).

Further, a specific frequency band needs to be allocated or reserved for a specific time in order to effectively implement the LTE-U technology/service. Therefore, in the LTE-U cell, the downlink transmission may be performed through a set of one or more consecutive subframes (downlink transmission burst) after the LBT. The downlink transmission burst may start as the regular subframe (rSF) or a partial subframe (pSF) according to an LBT situation. pSF may be a part of the subframe and may include a second slot of the subframe. Further, the downlink transmission burst may end as rSF or pSF.

Hereinafter, the channel access procedure which is defined in the LTE-A system for transmitting the PDSCH will be further described.

The eNB may perform a transmission including a PDSCH after sensing the channel to be idle during a defer period (Tt) and a random back-off counter reaches zero. The random back-off counter is adjusted by sensing the channel for additional slot duration(s) according to the steps below.

1) set $N=N_{init}$, where $N_{init}$ is a random number selected from uniformly distributed numbers between 0 and $CW_p$ 2) If N>0 and the eNB chooses to decrement the counter, set N=N−1.

3) sense the channel for an additional slot duration, and if the channel is sensed to be idle as a result, go to step 4; else, go to step 5;

4) If N=0, stop; else go to step 2).

5) sense the channel during an additional defer period ($T_d$).

6) If the channel is sensed to be idle during slot durations of the additional defer period $T_d$, go to step 2), else, go to step 5).

If the eNB has not performed a PDSCH transmission after step 4 in the procedure above, the eNB may perform a transmission including a PDSCH in the corresponding channel after the channel has been sensed to be idle during slot durations of an additional defer period $T_d$.

Herein, the defer period ($T_d$) consists of duration $T_f$(=16 us) immediately followed by $m_p$ consecutive slot durations. In this case, each slot duration $T_{sl}$ is 9 us, and $T_f$ includes an idle slot duration $T_{sl}$ at the start thereof.

In particular, nip is set according to a channel access priority class (CAPC) in Table 1 below. Table 1 shows channel access parameters according to the channel access priority used for a downlink transmission.

TABLE 1

| Channel Access Priority Class (p) | $m_p$ | $CW_{min, p}$ | $CW_{max, p}$ | $T_{mcot, p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

When the eNB senses the channel during the slot duration, and the power detected by the eNB for at least 4 us within the slot duration is less than an energy detection threshold $X_{Threshold}$, a slot duration $T_{sl}$ is considered to be idle. Otherwise, the slot duration $T_{sl}$ is considered to be busy.

For a CW adjustment, it is set to satisfy based on $CW_{min,p}$ and $CW_{max,p}$ set based on Table 1. In this case, $CW_{min,p}$ and $CW_{max,p}$ are chosen during step 1) of the procedure above related to the random backoff counter N. Also, $T_{mcot,p}$ is set according to Table 1 above, and the eNB should not consecutively perform transmission on a channel for a period exceeding T This is because, the unlicensed band is a frequency band that a plurality of wireless communication devices access through a competition procedure, and it is not preferable that any one of the wireless communication devices consecutively use it for a certain time or more. In Table 1, when the value of the channel access priority class is p=3 or p=4, the unlicensed band is used for a long term according to a regulation, and any wireless communication device using other technologies does not exist, then the wireless communication device can set $T_{mcot,p}$=10 ms. Otherwise, the wireless communication device can set $T_{mcot,p}$=8 ms.

In addition, the wireless communication device determines whether the channel is idle based on an energy detection (ED) threshold value. Specifically, the wireless communication device can determine that the channel is idle if the magnitude of the energy sensed on the channel is less than the threshold value. In this case, the ED threshold value may vary depending on whether or not wireless communication devices using other technologies coexist. Also, the ED threshold value may vary depending on a regulation of each country and region. Specifically, the ED threshold value can be determined as shown in Table 2 below.

In this case, the value of $T_{max}$ in Table 3 can be determined as shown in Equation 1 below.

$$T_{max}(\text{dBm}) = 10 \cdot \log 10 \left( 3.16288 \cdot 10^{-8} (\text{mW/MHz}) \cdot BW(\text{MHz}) \right) \quad \text{[Equation 1]}$$

Table 3 shows channel access parameters according to the channel access priority used for an uplink transmission.

TABLE 3

| LBT priority class | n | CWmin | CWmax | MCOT | Set of CW sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms (see note 1) or 10 ms (see note 2) | {15, 31, 63, 127, 255, 511, 1023} |
| 4 | 7 | 15 | 1023 | 6 ms (see note 1) or 10 ms (see note 2) | {15, 31, 63, 127, 255, 511, 1023} |

NOTE 1:
The MCOT of 6 ms may be increased to 8 ms by inserting one or more gaps. The minimum duration of a pause shall be 100 us. The maximum duration(Channel Occupancy) before including any such gap shall be 6 ms. The gap duration is not included in the channel occupancy time NOTE 2:
If the absence of any other technology sharing the carrier can be guaranteed on a long term basis(e.g. by level of regulation), the maximum channel occupancy time(MCOT) for LBT priority classes 3 and 4 is for 10 ms, otherwise, the MCOT for LBT priority classes 3 and 4 is 6 ms as in note 1.

Herein, 6 ms MCOT may be increased to 8 ms by inserting one or more gaps. In addition, the minimum duration of a gap should be 100 us. Further, the maximum duration before including any such gap should be 6 ms. In this case, the gap duration is not included in the channel occupancy time.

Herein, in the case of values of the priority class equal to 3 or 4, if the absence of any other RAT (e.g. Wi-Fi) on the same carrier can be guaranteed, the MCOT can be 10 ms. Otherwise, the MCOT is as in Note 1.

Hereinafter, a method of performing a channel access for an uplink transmission on the unlicensed band will be described.

As a method of performing channel access which is used by user equipment(s) for a transmission of uplink traffic corresponding to an uplink grant, a channel access method used when transmitting an uplink grant may be performed, or a single interval (such as 16 us, 25 us, 34 us, or 43 us) LBT (hereinafter, for a convenience of explanation, referred to as the second type channel access) may be performed in

TABLE 2

| Case | ED adaptation rule | Note |
|---|---|---|
| Case 1: Coexistance with other technologies | $X_{Thresh\_max} = \max \left\{ \begin{array}{l} -72 \text{ dBm (20 MHz)}, \\ \min \left\{ \begin{array}{l} T_{max}, \\ T_{max} - T_A + (P_H - P_{TX}) \end{array} \right\} \end{array} \right\}$ | $T_A$ = 10 dB for fx(s) including PDSCH; $T_A$ = 5 dB for fx(s) including DRS transmission(s) and not including PDSCH |
| | $P_H$ = 23 dB $P_{TX}$ is the set Max eNB output power in dBm for the carrier | |
| Case 2: Absence of Wi-Fi(e.g: by level of regulation) | $X_{Thresh\_max} = \min \left\{ \begin{array}{l} T_{max} + 10 \text{ dB}, \\ X_r \end{array} \right\}$ | |
| | Xr[dBm] is MAX ED threshold defined by regulation Otherwise $X_r = T_{max} + 10$ dB | | case of transmitting an uplink traffic within $M_{COT}$ secured when the uplink grant is transmitted. In this way, it is possible to enable fast channel access for an uplink data transmission. As another method of performing channel access which is used by user equipment(s) for a transmission of uplink traffic corresponding to an uplink grant, an LBT method used when transmitting an uplink grant may be performed, or a Cat-4 LBT (hereinafter, for a convenience of explanation, referred to as the first type channel access) may be performed in case of transmitting an uplink traffic outside of the $M_{COT}$ secured when the uplink grant is transmitted. Alternatively, a method in which the base station signals whether the user equipment performs a first type channel access with a back-off or a second type channel access enabling a fast channel access as an LBT for an uplink traffic may also be considered. The channel access type in which the base station can inform to the user equipment may be transmitted through the uplink grant and the base station may inform any one of the first type channel access or the second type channel access in the corresponding uplink grant. Herein, the first type channel access denotes Cat-4 LBT and the second type channel access denotes 25 us LBT.

Meanwhile, the base station may inform the user equipment of channel access related signaling such as CAPC and/or CW information (e.g. $CW_{min}$, $CW_{max}$, or $CW_p$) used by the base station at a downlink channel access for transmitting the uplink grant transmission through the uplink grant or a common control signaling. Upon receiving it, the user equipment may compare the CAPC or CW of the downlink channel access (or downlink LBT) performed by the base station for transmitting the uplink grant with CAPC or CW of an uplink traffic to be transmitted by the user equipment to perform an uplink traffic transmission corresponding to the uplink grant.

For example, when the CAPC or the CW of the downlink channel access is equal to or greater than the CAPC or the CW for the uplink traffic transmission, the second type channel access is performed to transmit the uplink traffic. On the other hand, when the CAPC or the CW of the downlink channel access is smaller than the CAPC or the CW for the uplink traffic transmission, the user equipment may be set to perform a channel access according to the CAPC of the uplink traffic to be transmitted. Such a method may be applied regardless of whether or not the uplink grant and the uplink traffic transmission corresponding thereto exist within the MCOT. Further, the method may be applied regardless of whether the uplink grant is simultaneously transmitted with the PDSCH or a single uplink grant transmission is performed.

Alternatively, the base station may notify the CW or CAPC of the downlink channel access performed for the transmission of the uplink grant(s) to the user equipment through an uplink grant or a common control signaling. Accordingly, the user equipment may determine the uplink channel access type for transmission of the scheduled uplink traffic(s) corresponding to the uplink grant by comparing the information with the CAPC or CW of the uplink traffic.

For example, when the uplink channel access is performed by comparing the CW, if the CW at the time of transmission of the uplink grant is equal to or greater than the CW of the uplink traffic corresponding to the uplink grant, the second type channel access may be performed. Otherwise, the first type channel access may be performed based on the CW of the uplink traffic. Also, when the uplink channel access is performed by comparing the CAPC, if the CAPC at the time of transmission of the uplink grant is equal to or greater than the CAPC of the uplink traffic corresponding to the uplink grant, the second type channel access may be performed. Otherwise, the first type channel access may be performed based on the CAPC of the uplink traffic.

When the user equipment performs the first type channel access, the user equipment may interpret the CAPC included in the common control signaling (e.g., common PDCCH) received from the base station or included in the uplink grant as a determined uplink CAPC based on the uplink traffic and the buffer status report (BSR). In addition, the user equipment may perform an uplink transmission according to the priority of the uplink traffic corresponding to the CAPC. Alternatively, when the user equipment performs the second type channel access, the user equipment may interpret the CAPC included in the common control signaling received from the base station or included in the uplink grant as a downlink CAPC used for the downlink transmission of the base station. In addition, the user equipment may perform the uplink transmission according to the priority of the uplink traffic corresponding the CAPC.

In the embodiment of the present invention, when the uplink channel access is performed, the channel access type that can be performed by the user equipment may be above-described first type or second type. In this case, as to the channel access type to be performed by the user equipment, the channel access type may be indicated through the uplink grant as shown in the description of the present invention.

In the case of performing the first type channel access, based on the recently received buffer status report (BSR) of the user equipment and the uplink traffic received from the user equipment, the base station may signal the CAPC when transmitting the common control channel (i.e., common-PDCCH) or the uplink grant to the user equipment. Then, the user equipment may be scheduled to transmit all the traffic(s) of CAPC having a priority equal to or higher (or in which the number of CAPC is smaller) than that of the signaled CAPC based on the corresponding CAPC. In this case, when scheduling all the traffic(s) of CAPC having a priority equal to or higher than a priority of the signaled CAPC, the base station should not schedule more subframes to the user equipment than it is needed to be transmitted.

In contrast, in the case of performing the second type channel access, based on the recently received BSR of the user equipment and the uplink traffic received from the user equipment and the downlink traffic by the base station, the base station may signal a DL CAPC used for the downlink transmission on the signaling field of an uplink CAPC when transmitting the common control channel or the uplink grant to the user equipment. Then, the user equipment may be scheduled to transmit all the traffic(s) of CAPC having a priority equal to or higher (or in which the number of CAPC is smaller) than that of the corresponding CAPC through a minimum number of subframes to be transmitted. In this case, when scheduling all the traffic(s) of CAPC having a priority equal to or higher than a priority of the signaled CAPC, the base station should not schedule more subframes to the user equipment than the minimum number of subframes that are needed to be transmitted.

In the case where the uplink grant is transmitted along with the transmission of the PDSCH considering the contention window (CW) and the CAPC used in the channel access at the user equipment and the base station, a channel access method for uplink transmission corresponding to the uplink grant and a channel access method for the uplink grant according to the present invention will be described. Further, the present invention also relates to a channel access method for transmission of a downlink control channel (e.g., PDCCH, EPDCCH) including uplink grant and uplink traffic corresponding to the uplink grant when transmitting only the uplink grant.

First, a channel access method for uplink grant transmission and a channel access method for uplink traffic corresponding to the uplink grant in the case where the uplink grant is transmitted along with the transmission of the PDSCH will be described.

1-1) A case where the base station manages a UE specific CW for each UE or each UE notifies the base station of the CW of the user equipment will be described.

It may be difficult for the base station to know the CAPC of the uplink traffic to be transmitted by each user equipment before transmission of the uplink grant. Therefore, the base station performs the downlink channel access for the control channel and the PDSCH transmission by determining the CW according to the CAPC for the PDSCH(s) to be transmitted. Further, the uplink grant included in the control channel is also performed by the same downlink channel access.

In this case, as a method for performing uplink channel access for transmission of uplink traffic(s) corresponding to the uplink grant(s), by comparing a CW (E.g., CW_eNB) among downlink channel access parameters used by the base station for transmission of the uplink grant and a CW (e.g., CW_UE(s)) managed by the base station for the uplink channel access of each UE, the second type of uplink channel access for transmission of the scheduled uplink traffic(s) corresponding to the uplink grant(s) may be performed or a channel access according to CAPC of uplink traffic to be transmitted by the user equipment with respect to the uplink transmission scheduled by the uplink grant may be performed.

In addition, when the condition for the second type channel access of uplink is not met, each user equipment cannot perform the second type channel access. Therefore, the base station may inform the user equipment of the maximum CW size of the user equipment(s) to be scheduled by the uplink grant managed by the base station so that uplink channel access with respect to the uplink traffic can be performed. Alternatively, the base station may inform the maximum CW size for the CAPC of the uplink traffic of the UE(s) to be scheduled by the uplink grant(s) so that uplink channel access with respect to the uplink traffic can be performed. In addition, the base station may signal a common backoff counter which is set based on the maximum CW size of the user equipment(s) to be scheduled by the uplink grant(s) to the user equipment. Further, the base station may transmit the signaling for the uplink channel access of the user equipment(s) by containing it in the uplink grant or transmit the signaling to the UE(s) through the common control channel as a base station signaling.

More specifically, when a CW (e.g., CW_eNB) as a downlink channel access parameter used by the base station for transmission of the uplink grant(s) is equal to or greater than the maximum value of CWs (e.g., CW__UE(s)) for the traffic(s) of the user equipment(s) scheduled by the uplink grant(s) (for example, in a condition of Equation 2 or Equation 3 below), the user equipment may perform the second type channel access to transmit the uplink transmission for uplink traffic corresponding the uplink grant(s) since the base station has performed the downlink channel access with a CW having a sufficient length from the transmission of the UL grant. As an example, the case can be expressed by the following Equation 2 or Equation 3. Equation 2 represents the condition that is equal to or greater than the maximum value of CWs (e.g., CW_UE_i, p_j) of all CAPCs for the traffic(s) of the UE(s) scheduled by the uplink grant(s) managed by the base station. Equation 3 represents the condition that is equal to or greater than the maximum value of CWs (e.g., CW_UE_i, p_j) of the same CAPC for the traffic(s) of the UE(s) scheduled by the uplink grant(s) managed by the base station.

$$CW_{eNB} \text{ for } UL \text{ grant}(s) \geq \max\{CW_{UE_1,p_1}, \ldots , CW_{UE_j,p_j}\} \quad \text{[Equation 2]}$$
$$\text{for scheduled } UE(s) \text{ by the } UL \text{ grant}(s)$$

where $p_j$ is an index of CAPC, and i is an index of UTE(s) scheduled by uplink grant(s).

$$CW_{eNB} \text{ for } UL \text{ grant}(s) \geq \max\{CW_{UE_1,p}, \ldots , CW_{UE_i,p}\} \quad \text{[Equation 3]}$$
$$\text{for scheduled } UE(s) \text{ by the } UL \text{ grant}(s)$$

where p; is an index of channel access priority class (CAPC), $p_j \in \{1,2,3,4\}$ and i is an index of UE(s) scheduled by uplink grant(s).

In the opposite case, when a CW as a downlink channel access parameter used by the base station for transmission of the uplink grant(s) is less than the maximum value of CWs for the uplink traffic(s) of the UE(s) scheduled by the uplink grant(s), the user equipment may perform a channel access according to CAPC of uplink traffic to be transmitted by the user equipment with respect to the uplink transmission scheduled by the uplink grant.

In addition, when the condition for the second type channel access of uplink is not met, each user equipment cannot perform the second type channel access. Therefore, the base station may inform the user equipment of the maximum CW size of the UE(s) to be scheduled by the uplink grant(s) managed by the base station so that uplink channel access with respect to the uplink traffic can be performed. Alternatively, the base station may inform the maximum CW size for the CAPC of the uplink traffic of the UE(s) to be scheduled by the uplink grant(s) so that uplink channel access with respect to the uplink traffic can be performed. In addition, the base station may signal a common back-off counter which is set based on the maximum CW size of the user equipment(s) to be scheduled by the uplink grant(s) to the user equipment. Further, the base station may transmit the signaling for the uplink channel access of the UE(s) by containing it in the uplink grant or transmit the signaling to the UE(s) through the common control channel as a base station signaling.

According to another embodiment of enabling fast channel access for the uplink traffic(s) of the UE(s), a CW (or a CAPC) in the eNB for performing channel access for the control channel and PDSCH transmission may be set to the maximum value of CWs (or CAPCs) for the uplink traffic(s) of the UE(s) to be scheduled, to perform a downlink channel access to the control channel including the uplink grant and the PDSCH transmission. This allows the CW value of the channel access used for transmission of the uplink grant(s) to be set not to be less than the maximum value of CWs (or CAPCs) for the uplink traffic(s). Accordingly, it is possible to perform uplink transmission through a fast channel access, i.e., the second type channel access for uplink transmission of the uplink traffic corresponding to the uplink grant(s). Further, the base station may transmit the signaling for the uplink channel access of the user equipment(s) by containing it in the uplink grant or transmit the signaling to the UE(s) through the common control channel as a base station signaling.

1-2) A case where the base station manages only the CW for the transmission of the base station without information on the CW of the user equipment and each UE(s) manages the CW will be described.

In the case that the base station performs the channel access for transmission of the uplink grant(s) according to the CAPC of the PDSCH(s), when an uplink transmission by the uplink grant(s) exists within the MCOT, the user equipment may perform the uplink channel access for transmission of the scheduled uplink traffic(s) through the second type channel access. In addition, when the uplink transmission is scheduled outside the MCOT, the user equipment may perform the channel access according to the CAPC of the uplink traffic to be transmitted by the user equipment for uplink transmission scheduled by the uplink grant.

Next, in a case where only the uplink grant is transmitted without transmission of the PDSCH, a channel access method for uplink grant transmission and a channel access setting method for the uplink traffic corresponding to the uplink grant will be described.

2-1) A case where the base station manages the UE specific CW for each UE or each UE informs the base station of the CW of the user equipment will be described.

In the case where only the uplink grant is transmitted without transmission of the PDSCH, it is not known which values to be used as downlink channel access parameters for the uplink grant. If a CW (E.g., CW_eNB) as a downlink channel access parameter used by the base station for transmission of the uplink grant(s) is equal to or greater than the maximum value of CWs (e.g., CW_UE(s)) for the traffic(s) of the user equipment(s) scheduled by the uplink grant(s) (for example, in a condition of Equation 2 or Equation 3), the user equipment may perform the uplink transmission through the second type channel access to perform a fast channel access for the uplink transmission of uplink traffic corresponding the uplink grant since the base station has performed the downlink channel access with a CW having a sufficient length from the transmission of the UL grant. As an example, the case can be expressed by the Equation 2 or Equation 3.

Equation 2 represents the condition that is equal to or greater than the maximum value of CWs (e.g., CW_UE_i, p_j) of all CAPCs for the traffic(s) of the user equipment(s) scheduled by the uplink grant(s) managed by the base station. Equation 3 represents the condition that is equal to or greater than the maximum value of CWs (e.g., CW_UE_i, p_j) of the same CAPC for the traffic(s) of the user equipment(s) scheduled by the uplink grant(s) managed by the base station.

In addition, when the condition for the second type channel access of uplink is not met, each user equipment cannot perform the second type channel access. Therefore, the base station may inform the user equipment of the maximum CW size of the UE(s) to be scheduled by the uplink grant(s) managed by the base station so that uplink channel access with respect to the uplink traffic can be performed. Alternatively, the base station may inform the maximum CW size for the CAPC of the uplink traffic of the UE(s) to be scheduled by the uplink grant(s) so that uplink channel access with respect to the uplink traffic can be performed. In addition, the base station may signal a common back-off counter which is set based on the maximum CW size of the user equipment(s) to be scheduled by the uplink grant(s) to the user equipment.

In addition, the base station may transmit the signaling for the uplink channel access of the UE(s) by containing it in the uplink grant or transmit the signaling to the UE(s) through the common control channel as a base station signaling.

In the opposite case, when a CW as a downlink channel access parameter used by the base station for transmission of the uplink grant(s) is less than the maximum value of CWs for the uplink traffic(s) of the UE(s) scheduled by the uplink grant(s), the user equipment may perform a channel access according to CAPC of uplink traffic to be transmitted by the user equipment with respect to the uplink transmission scheduled by the uplink grant. In addition, when the condition for the second type channel access of uplink is not met, each user equipment cannot perform the second type channel access. Therefore, the base station may inform the user equipment of the maximum CW size of the UE(s) to be scheduled by the uplink grant(s) managed by the base station so that uplink channel access with respect to the uplink traffic can be performed. Alternatively, the base station may inform the maximum CW size for the CAPC of the uplink traffic of the UE(s) to be scheduled by the uplink grant(s) so that uplink channel access with respect to the uplink traffic can be performed. In addition, the base station may signal a common back-off counter which is set based on the maximum CW size of the user equipment(s) to be scheduled by the uplink grant(s) to the user equipment. Further, the base station may transmit the signaling for the uplink channel access of the UE(s) by containing it in the uplink grant or transmit the signaling to the UE(s) through the common control channel as a base station signaling.

According to yet another embodiment of enabling fast channel access for the uplink traffic(s) of the UE(s), a CW (or a CAPC) in the eNB for performing downlink channel access for the control channel including only uplink grant may be set to the maximum value of CWs (or CAPCs) for the uplink traffic(s) of the UE(s) to be scheduled, to perform a downlink channel access to the control channel including the uplink grant. This allows the CW (or CAPC) value of the channel access used for transmission of the uplink grant(s) to be set not to be less than the maximum value of CWs (or CAPCs) for the uplink traffic(s). Accordingly, it is possible to perform uplink transmission through a fast channel access, i.e., the second type channel access for uplink transmission of the uplink traffic corresponding to the uplink grant(s). Further, the base station may transmit the signaling for the uplink channel access of the user equipment(s) by containing it in the uplink grant or transmit the signaling to the UE(s) through the common control channel as a base station signaling.

2-2) A case where the base station manages only the CW for the transmission of the base station without information on the CW of the user equipment and each UE(s) manages the CW will be described.

In the case of setting up the uplink channel access by performing the CW comparison, when a CW used for transmission of the uplink grant is equal to or greater than a CW of the uplink traffic scheduled by the uplink grant and managed by the UE, the UE performs the second type channel access. Otherwise, the UE performs the first type channel access based on the CW of the uplink traffic managed by the UE. In the case of setting up the uplink channel access by performing the CAPC comparison, when a CAPC used for transmission of the uplink grant is equal to or greater than a CAPC of the uplink traffic scheduled by the uplink grant, the UE performs the second type channel access. Otherwise, the UE performs the first type channel access based on the CAPC of the uplink traffic managed by the user equipment.

According to yet another embodiment, in the case that the base station performs the channel access for transmission of the uplink grant(s) according to a CAPC arbitrarily set by the base station, when an uplink transmission by the uplink grant(s) exists within the MCOT, the user equipment may perform the uplink channel access for transmission of the scheduled uplink traffic(s) through the second type channel access. In addition, when the uplink transmission is scheduled outside the MCOT, the user equipment may perform the channel access according to the CAPC of the uplink traffic to be transmitted by the user equipment for uplink transmission scheduled by the uplink grant.

Meanwhile, when the user equipment is in a power limitation state, some subframes may be dropped by power scaling rules in the case of transmission of consecutive subframe(s) on the unlicensed band. Hereinafter, a channel access procedure for uplink transmission in such a situation will be described.

In case of the unlicensed band, the base station may allocate consecutive subframes to the user equipment. If the uplink channel access is successful by performing the channel access type signaled from the uplink grant before the transmission of the consecutive subframes, that is, one of the first type channel access or the second type channel access, the transmission is continuously performed for the consecutive subframe. Here, if it is scheduled without a gap between uplink subframes, when the uplink transmission is performed after a channel access is successful in a starting subframe or a specific subframe of the uplink burst including the corresponding uplink subframes, the transmission of the subsequent uplink subframes belonging to the uplink burst can be continuously performed without a channel access. However, when the user equipment is in a power limitation state, a certain subframe in the unlicensed band may be dropped due to the uplink transmission in the licensed band.

Figure 15:
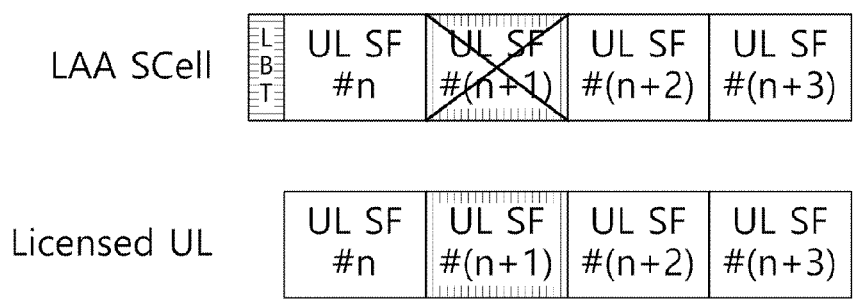
FIG. 15 illustrates a case where one subframe in an unlicensed band is dropped.

FIG. 15 illustrates a case where one subframe in an unlicensed band, that is, on a LAA SCell is dropped. In particular, FIG. 15 shows a case that four consecutive uplink subframes are scheduled in the unlicensed band, but uplink transmission on the uplink subframe #(n+1) in the unlicensed band is dropped due to a transmission of the uplink channel in the uplink subframe #(n+1) on the licensed band in a situation where the power of the user equipment is limited.

In this case, the user equipment, which has intended to perform data transmission on the consecutive uplink subframe after the success of the uplink channel access on the unlicensed band, should determine whether to perform the uplink channel access or which type of channel access should be performed for uplink transmission in the uplink subframe #(n+2) or #(n+3). In addition, it should also be considered that which channel access parameters should be used when performing the first type channel access.

Above all, it is assumed that the second type channel access is set to be performed at the start time of an uplink burst for uplink transmission on the unlicensed band. When the second type channel access is only performed and successful on the unlicensed band just before the transmission of the subframe #(n+2), the uplink data transmission in the uplink subframes #(n+2) and #(n+3) may be performed. Here, if the second type channel access is failed, the following three methods can be considered.

First, when the channel access is successful by setting to continuously perform the second type channel access, the transmission in the uplink subframe #(n+3) may be performed. In this case, if the second type channel access is successful in the uplink subframe #(n+2), it may be set to start the uplink transmission after the success time. Further, the cyclic prefix (CP) of the next symbol, that is, the uplink subframe #(n+3) may be extended in order to occupy a part of the uplink subframe #(n+2) after the success time.

Second, a method for setting up to perform the first type channel access from the uplink subframe #(n+2) for transmission of the uplink data in the uplink subframe #(n+3) may be considered. In particular, it can be possible to set a parameter based on the CAPC #1 having the highest priority to perform the first type channel access.

Third, when a channel access type is indicated from the base station through the uplink grant, the base station may indicate the CAPC through the CAPC field in the uplink grant. Then, the user equipment may set a channel access parameter to perform the first type channel access based on the indicated CAPC and perform the first type channel access. However, in the case of the uplink transmission burst, since it is indicated, through the uplink grant from the base station, to perform the second type channel access when the signaling on the channel access type is initially received from the base station, the first type channel access may not be reflected in the adjustment of the contention window size (CWS) even if the first type channel access has been performed for transmission of the remaining subframes of the UL transmission burst. Alternatively, for the first type channel access in the subframe #(n+2) performed by the user equipment, it may be applied to the CWS adjustment when a transmission is scheduled by the first type channel access after next 4 ms.

Next, it is assumed that the first type channel access is set to be performed as the channel access type at the start time of the uplink burst on the unlicensed band. When the first type channel access is set to be performed from the subframe #(n+1) on the unlicensed band and the first type channel access is completed before the transmission in the subframe #(n+2) on the unlicensed band, uplink data transmissions scheduled in the uplink subframe #(n+2) and the uplink subframe #(n+3) may be performed. When the first type channel access is not completed before transmission in the subframe #(n+2) on the unlicensed band, the first type channel access is continued until the transmission of the subframe #(n+3) on the unlicensed band. In this case, the random back-off counter used for the first type channel access is continuously reused.

On the other hand, in the case that the second type channel access is performed on the unlicensed band just before the subframe #(n+2) transmission and the second type channel access is successful, uplink data transmission in the uplink subframe #(n+2) and the uplink subframe #(n+3) may be performed. However, if the second type channel access is failed, the following three methods can be considered.

First, when the channel access is successful by setting to continuously perform the second type channel access, the transmission in the uplink subframe #(n+3) may be performed. In this case, if the second type channel access is successful in the uplink subframe #(n+2), it may be set to start the uplink transmission after the success time. Further, the cyclic prefix (CP) of the next symbol, that is, the uplink subframe #(n+3) may be extended in order to occupy a part of the uplink subframe #(n+2) after the success time.

Second, a method for setting up to perform the first type channel access from the uplink subframe #(n+2) for transmission of the uplink data in the uplink subframe #(n+3) may be considered. In particular, it can be possible to set a parameter based on the CAPC #1 having the highest priority to perform the first type channel access.

Third, when the second type channel access is indicated from the base station through the uplink grant, the base station may indicate the CAPC through the CAPC field in the uplink grant. Then, the user equipment may set a channel access parameter to perform the first type channel access based on the indicated CAPC and perform the first type channel access. However, in the case of the uplink transmission burst, since it is indicated, through the uplink grant from the base station, to perform the first type channel access when the signaling on the channel access type is initially received from the base station, subframe #n as shown in FIG. 15 may be set as a reference subframe to be applied to the CWS adjustment. Further, in the perspective of the user equipment that one uplink transmission burst has been split and the first type channel access are performed at different points of time, the subframe #(n+2) or the subframe #(n+3) may be set to a reference subframe considering as the different uplink transmission bursts. Then, it may be applied as the reference subframe for the CWS adjustment when a transmission is scheduled for the first type channel access performed by the user equipment after next 4 ms.

Hereinafter, a method for scheduling an uplink burst to a user equipment by a base station will be described.

Figure 16:
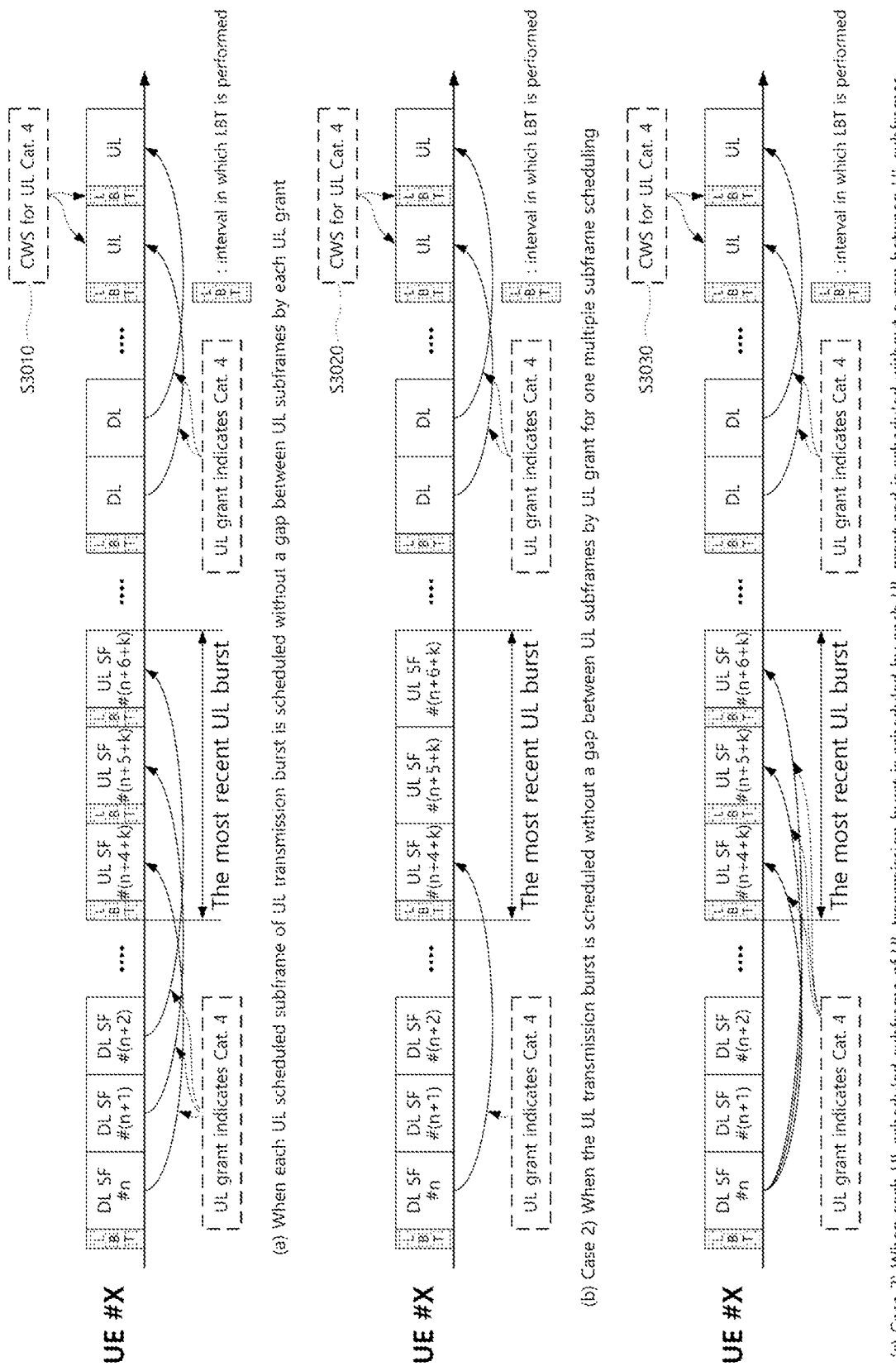
FIG. 16 illustrates embodiments in which a base station schedules uplink subframe(s) of an uplink burst to a user equipment.

FIG. 16 shows examples in which a base station schedules uplink subframe(s) of an uplink burst to the user equipment. In particular, a method that the base station schedules to the user equipment without a gap for channel access between consecutive uplink subframes(s) of an uplink burst will be illustrated.

FIG. 16(a) illustrates a method of determining a contention window size (CWS) in a subframe in which the first type channel access is to be performed for uplink transmission in the case that each of the uplink subframes constituting the most recent uplink burst is scheduled without a gap by the respective uplink grant (S3010). If the first type channel access in the first subframe of the uplink burst is successful, it is determined that the uplink subframe is continuously transmitted without an additional channel access procedure.

However, if the first type channel access in the first subframe is not successful, a channel access of the type signaled from the base station should be performed in each uplink subframe. Signaling of each uplink grant for each subframe constituting the uplink burst to the same user equipment may be a method to avoid being unable to transmit all the uplink transmissions that have been continuously scheduled due to the failure of the uplink grant or the failure of the uplink channel access.

FIG. 16(b) illustrates a method for determining a CWS in a subframe in which the first type channel access is to be performed for uplink transmission in the case that the most recent uplink burst is scheduled without a gap between uplink subframes by an uplink grant for scheduling multiple subframe (S3020). If the first type channel access in the first subframe of the uplink burst is successful, uplink transmission on multiple subframes is performed. However, if the first type channel access in the first subframe of the uplink burst is failed, the first type channel access is performed in every subframe within the scheduled multiple subframes until the first type channel access is successful. Therefore, if the first type channel access is successful in the second subframe, the uplink transmission is continuously performed in the second and third uplink subframes according to the uplink grant.

FIG. 16(c) illustrates a method of determining a CWS in a subframe in which the first type channel access is to be performed for uplink transmission in the case that each subframe of the most recent uplink burst is scheduled without a gap between the uplink subframes by each uplink grant transmitted from a single downlink subframe (S3030). In this case, if the first type channel access in the first subframe of the uplink burst is successful, uplink subframes are continuously transmitted without an additional channel access procedure. However, if the first type channel access in the first subframe of the uplink burst is not successful, the uplink transmission in each subframe is performed after the channel access procedure of the type signaled through the uplink grant from the base station is performed and successful in each subframe. Signaling of each uplink grant for each subframe constituting the uplink burst to the same user equipment may be a method to avoid being unable to transmit all the uplink transmissions that have been continuously scheduled due to the failure of the uplink grant or the failure of the uplink channel access.

Figure 17:
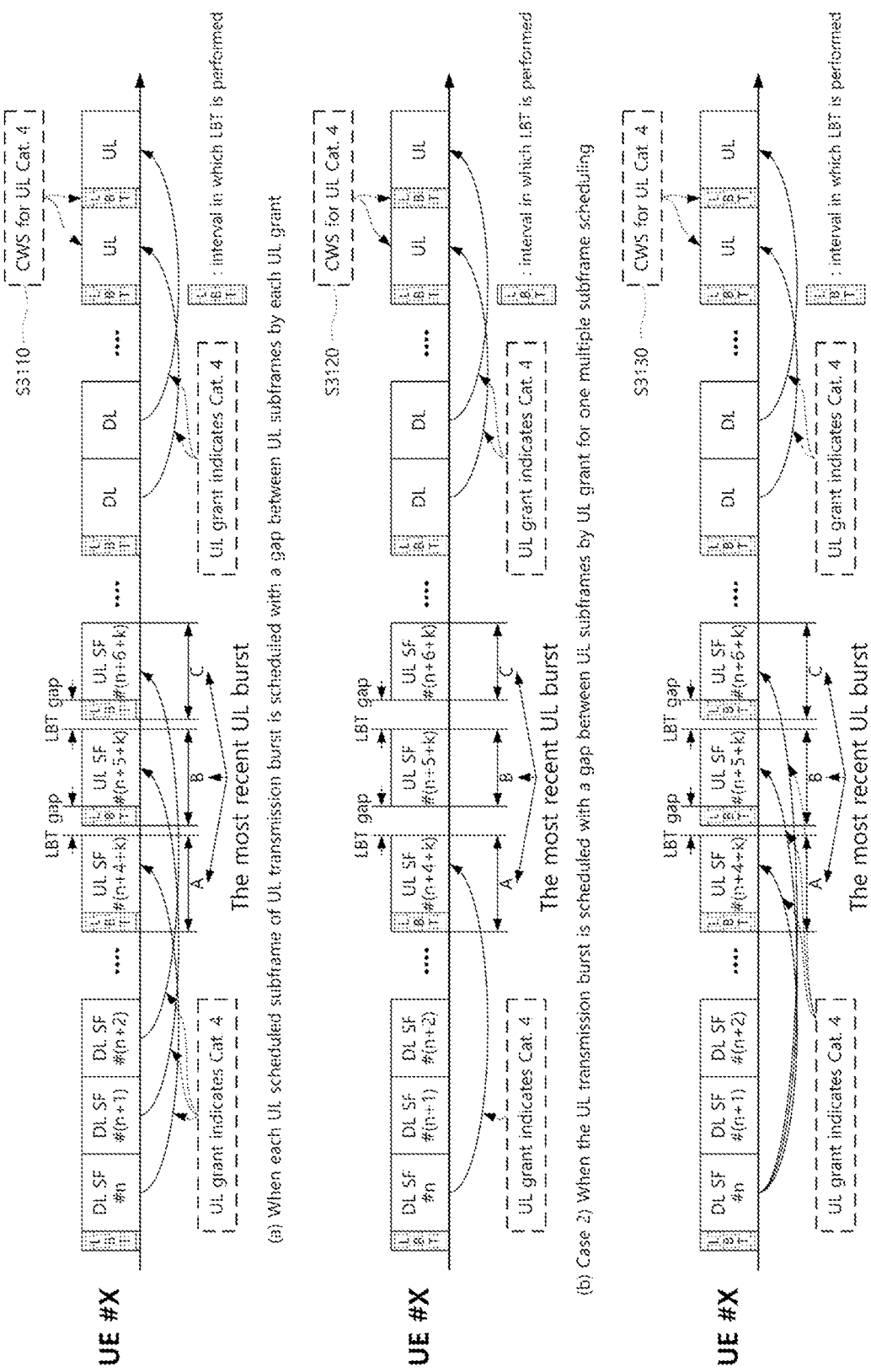
FIG. 17 illustrates other embodiments in which a base station schedules uplink subframe(s) of an uplink burst to a user equipment.

FIG. 17 shows other examples in which a base station schedules uplink subframe(s) of an uplink burst to the user equipment. In particular, a method that the base station schedules to the user equipment with a gap for channel access between consecutive uplink subframes(s) of an uplink burst will be illustrated.

FIG. 17(a) illustrates a method of determining a contention window size (CWS) in a subframe in which the first type channel access is to be performed for uplink transmission in the case that each of the uplink subframes constituting the most recent uplink burst is scheduled with a gap between uplink subframes by the respective uplink grant (S3110). In this case, each of the uplink subframes configured to perform the first type channel access due to the gap between the uplink subframes may be regarded as an uplink burst. In this case, each uplink burst may perform uplink channel access according to the channel access type indicated by the uplink grant from the base station to perform uplink transmission on the uplink subframe. Alternatively, if the channel access in the first subframe of the uplink burst according to the channel access type indicated by the uplink grant is failed, the channel access in the next subframe is performed according to the channel access type indicated by the uplink grant for transmission of the next subframe and the uplink transmission is performed when the channel access is successful.

FIG. 17(b) illustrates a method of determining a CWS in a subframe in which the first type channel access is to be performed for uplink transmission in the case that the most recent uplink burst is scheduled with a gap between uplink subframes by an uplink grant for scheduling multiple subframe (S3120). In this case, if the first type channel access in the first subframe of the uplink burst is successful, uplink transmission on multiple subframes is performed. However, if the first type channel access in the first subframe of the uplink burst is failed, the first type channel access is performed in every subframe within the scheduled multiple subframes until the first type channel access is successful. For example, if the first type channel access is successful in the second subframe, the uplink transmission is continuously performed in the second and third uplink subframes according to the uplink grant.

FIG. 17(c) illustrates a method of determining a CWS in a subframe in which the first type channel access is to be performed for uplink transmission in the case that each subframe of the most recent uplink burst is scheduled with a gap between the uplink subframes by each uplink grant transmitted from a single downlink subframe (S3130). In this case, each of the uplink subframes configured to perform the first type channel access due to the gap between the uplink subframes may be regarded as the uplink burst. In this case, each uplink burst may perform uplink channel access according to the channel access type indicated by the uplink grant from the base station to perform uplink transmission on the uplink subframe. Alternatively, if the channel access in the first subframe of the uplink burst according to the channel access type indicated by the uplink grant is failed, the channel access in the next subframe is performed according to the channel access type indicated by the uplink grant for transmission of the next subframe and the uplink transmission is performed when the channel access is successful.

Hereinafter, a description will be made of a procedure in a user equipment in a case where a user equipment fails in channel access after the user equipment is scheduled for uplink transmission from the base station. In particular, the procedure of the user equipment will be described in the case that the base station has transmitted the uplink grant(s) for the PUSCH to the UE(s) but the UE(s) which have received the uplink grant(s) have failed the first type channel access or the second type channel access for the UL transmission.

First, there may be a case where an arbitrary UE is scheduled to perform uplink transmission continuously, that is, a case where uplink grant(s) included in the control channel of each downlink subframe on consecutive multiple downlink subframes is transmitted to a single user equipment or a case where the continuous uplink transmission is performed through a single uplink grant included in the control channel of a single downlink subframe by a multiple subframe scheduling.

In this case, as an embodiment of the present invention, in a case where consecutive uplink subframes are scheduled to the same UE, when the channel access (for example, the second type channel access or the first type channel access) for uplink transmission scheduled in the first uplink subframe is failed, only the uplink transmission scheduled in the corresponding uplink subframe may be set being unable to transmit according to a result of the channel access failure for the uplink subframe. Further, a reservation signal may be transmitted so that an uplink transmission in the next subframe can be determined through the channel access in the next subframe.

The reservation signal may be transmitted until the channel access time of the next scheduled subframe so that it is possible to determine whether to perform uplink transmission depending on the channel access in the next uplink subframe. As an embodiment of the method of transmitting the reservation signal, a method may be considered in which a reservation signal is transmitted only through a subset of resources that are scheduled for uplink transmission but cannot be used for transmission due to channel access failure. Alternatively, according to another embodiment, a method may be considered in which the reservation signal is transmitted with a predefined signal through a dedicated resource of the corresponding uplink subframe by using a dedicated resource preset in advance. Such a method may be applied as an operation within the MCOT set by the base station. However, considering the case of the cross-downlink burst scheduling, the method can be applied to the operation outside the MCOT set by the base station. Further, the consecutive uplink subframes may be applied when they are in the same MCOT.

In the case of UEs that are not scheduled at the start time of the uplink subframe, when uplink transmissions of other UEs that are scheduled first after the transmission of the DL is completed are scheduled to be transmitted in the n-th subframe but uplink transmission of UE #1 is scheduled to be performed in the (n+1)-th, (n+2)-th or (n+3)-th uplink subframe other than the n-th subframe at which uplink transmissions of other UEs start, it can be considered that the UE #1 which is not scheduled at the n-th subframe on which the uplink subframe starts performs the reservation signal transmission so that the uplink transmission in the next uplink subframe can be determined through channel access in the next subframe. The reservation signal may be transmitted until the channel access time of the next scheduled subframe so that it is possible to determine whether to perform uplink transmission depending on the channel access in the next uplink subframe.

As an embodiment of the method of transmitting the reservation signal, a method may be considered in which a reservation signal is transmitted only through a subset of resources that are scheduled for uplink transmission but cannot be used for transmission due to channel access failure. Alternatively, according to another embodiment, a method may be considered in which the reservation signal is transmitted with a predefined signal through a dedicated resource of the corresponding uplink subframe by using a dedicated resource preset in advance. Such a method may be applied as an operation within the MCOT set by the base station. However, considering the case of the cross-downlink burst scheduling, the method can be applied to the operation outside the MCOT set by the base station. Further, the consecutive uplink subframes may be applied when they are in the same MCOT.

In contrast, there may be a method in which the base station indicates the last uplink subframe in the uplink grant. In case of the multiple subframe scheduling, the base station may indicate the last subframe of multiple subframes scheduled with the uplink grant. In case that the user equipment receives information on the last uplink subframe, if the uplink subframe in which a channel access for the scheduled uplink transmission is performed is the last uplink subframe and the uplink channel access (i.e., the second type channel access or the first type channel access) is failed, then the PUSCH transmission indicated by the uplink grant in the uplink subframe is dropped. However, if the uplink subframe scheduled by the uplink grant is not indicated to be the last subframe or is not the last subframe, by transmitting a specific reservation signal, it is guaranteed that whether to perform the transmission of UEs scheduled in the next subframe can be determined according to the success or failure of channel access in the next subframe.

The reservation signal may be transmitted until the channel access time of the next scheduled subframe so that it is possible to determine whether to perform uplink transmission depending on the channel access in the next uplink subframe. As an embodiment of the method of transmitting the reservation signal, a method may be considered in which a reservation signal is transmitted only through a subset of resources that are scheduled for uplink transmission but cannot be used for transmission due to channel access failure. Alternatively, according to another embodiment, a method may be considered in which the reservation signal is transmitted with a predefined signal through a dedicated resource of the corresponding uplink subframe by using a dedicated resource preset in advance. Such a method may be applied as an operation within the MCOT set by the base station. However, considering the case of the cross-downlink burst scheduling, the method can be applied to the operation outside the MCOT set by the base station. Further, the consecutive uplink subframes may be applied when they are in the same MCOT.

According to yet another embodiment of the present invention, when a channel access for uplink transmission scheduled according to an uplink grant is performed regardless of a single subframe scheduling or a multiple subframe scheduling, if the channel access (e.g. the second type channel access or the first type channel access) set to the user equipment in the uplink subframe is failed, a method of always dropping the uplink transmission may be considered.

Hereinafter, the channel access for the PUSCH including the PUCCH and the UCI will be described.

Unlike the PUSCH for receiving the scheduling information from the base station, the PUCCH is a non-scheduled channel. If the PUCCH and PUSCH are set to be simultaneously transmitted, simultaneous transmission of PUCCH and PUSCH is possible. Otherwise, if the PUSCH is scheduled from the base station, the HARQ-ACK values for the PDSCH transmission and the UCIs such as CQI, RI and PMI can be piggybacked to the scheduled PUSCH and transmitted. However, if the PUSCH is not scheduled from the base station, the HARQ-ACK values and the CQI can be transmitted through the PUCCH. Accordingly, the UCIs in the unlicensed carriers can be transmitted through the uplink PUCCH or PUSCH in the unlicensed carrier. In this case, the channel access method of the PUSCH including the PUCCH or UCI in the unlicensed carrier can be performed to be set as follows.

For the PUCCH, there may be a case in which a value of 'ACK', 'NACK', 'NACK/DTX', or 'DTX' as a HARQ-ACK is transmitted, a case in which a periodic CSI is transmitted, and a case in which values as a HARQ-ACK and periodic CSI are simultaneously transmitted on a single PUCCH format. The values as a HARQ-ACK corresponding to the PDSCH may be the most preferential information that should be fed back to the base station in terms of downlink throughput, and may be prioritized over periodic CSI values for link adaptation. Therefore, when the HARQ-ACK corresponding to the PDSCH is included in the PUCCH transmitted by the user equipment, the user equipment may use the second type channel access as a fast channel access or use the first type channel access with the highest priority CAPC (e.g. CAPC #1) as a method for performing the channel access. In addition, when only the CQI is transmitted through the PUCCH, the first type channel access can be performed. This is because the channel state information (CSI) in the unlicensed carrier may not have a great importance under the condition that the channel access is not guaranteed.

For the PUSCH including the UCI, the channel access method for PUSCH can be set according to whether the HARQ-ACK value is included in the UCI or not. When the HARQ-ACK for the PDSCH is included in the PUSCH including the UCI, the user equipment uses the second type channel access as the fast channel access or uses the first type channel access with the highest priority CAPC (e.g. CAPC #1) as a method for performing channel access. In addition, when only the CQI is transmitted through the PUSCH, the first type channel access may be performed. However, in the case of the PUSCH including the UCI, it is considered that the uplink grant for scheduling the PUSCH is transmitted on the DL transmission after the channel access is performed in advance. Accordingly, in the case that the channel access method of the PUSCH is set by depending on the channel access method used in the transmission of the uplink grant, when the channel access of the PUSCH is in a condition to use the fast channel access, the transmission of the PUSCH including the UCI is set to be performed by overriding the corresponding channel access method. Otherwise, it is possible to set the transmission of the PUSCH with the UCI to be performed using a channel access method capable of faster channel access between the two. Alternatively, only for the transmission of PUSCH with UCI including the HARQ-ACK, it is possible to set the transmission of the PUSCH with the HARQ-ACK to be performed using a channel access method capable of faster channel access between the two which are an uplink channel access set by depending on the uplink grant and a predetermined channel access for transmission of the PUSCH with the UCI including the HARQ-ACK.

Hereinafter, a channel access for PDCCH command (or, order), PRACH and RAR in the random access procedure will be described.

As a method for establishing a channel access for a PDCCH when triggering a non-contention based PRACH transmission by a PDCCH command, when transmitting a PDCCH to the user equipment in order to trigger PRACH for uplink synchronization, the channel access for the PDCCH method may be considered to use the second type channel access as the fast channel access or to enable the channel access to the PDCCH with the highest priority CAPC (e.g. CAPC #1). In contrast, in the case of carrying the PDCCH and the PDSCH for the same UE or the other UE(s) in the downlink subframe including the PDCCH for the PRACH triggering, the channel access parameter(s) (e.g. m_p, CW_min, CW_max, T_mcot, allowed CW_p sizes) may be set according to the CAPC set for the corresponding PDCCH/PDSCH transmission.

Next, the PRACH is a channel for transmitting a random access preamble, and is the highest priority channel in a situation where the user equipment is limited in power during carrier aggregation (CA). Therefore, the transmission power of the PRACH may be given the higher priority than other uplink channel(s) (e.g. PUSCH, PUSCH with UCI, PUSCH without UCI) and signal (e.g. SRS). Alternatively, other uplink channels or signals may be dropped to ensure transmission of the PRACH. Therefore, when PRACH transmission is set, a method of setting to be transmitted without channel access as a fast channel access may be used. This is because, if the transmission of the PRACH fails due to the channel access, the user equipment cannot guarantee uplink transmissions because the user equipment cannot synchronize on the unlicensed carriers, which may significantly increase the unnecessary latency. Therefore, it is possible to set the user equipment to perform PRACH transmission to the base station without performing a channel access. Alternatively, a method of enabling channel access for the PRACH to be performed using the second type channel access or to be performed with the highest priority CAPC (e.g., CAPC #1) may be considered.

With respect to the random access response (RAR), after transmitting the random access preamble as described above, the user equipment attempts to receive random access response for the user equipment in the random access response reception window indicated through the system information or the handover command by the base station. The RAR is transmitted in the form of a MAC PDU, and the MAC PDU is carried in the PDSCH. In addition, the PDCCH is also transmitted together with the PDSCH for the appropriate reception of the information carried in the PDSCH. The PDCCH includes information of a user equipment to receive the PDSCH, frequency and time information of a radio resource of the PDSCH, and a transmission format of the PDSCH.

Once the user equipment succeeds in receiving the PDCCH transmitted to the user equipment, the user equipment appropriately receives the random access response transmitted on the PDSCH according to the information of the PDCCH. The random access response includes a random access preamble identifier, an uplink grant, a temporary C-RNTI, and a time alignment correction value (e.g. time alignment command). The reason why the random access preamble identifier is needed is that since random access response information for one or more user equipments may be included in one random access response, it is to inform which user equipment the uplink grant, temporary C-RNTI, and time synchronization correction value information are valid for.

Unlike the contention-based random access procedure, the non-contention-based random access procedure determines that the random access procedure has been normally performed by receiving the random access response information, and terminates the random access procedure. Also, the non-contention-based random access procedure may be performed in the case of the handover process and in the case of being requested by the base station. For the non-contention-based random access procedure, it is important to receive a dedicated random access preamble from the base station that has no possibility of collision. As a method for receiving the random access preamble, there are a handover command and a PDCCH command. The base station may also set a PRACH resource in which the user equipment transmits the random access preamble.

The PRACH resource includes a subframe and a frequency resource used by the user equipment for the random access preamble transmission. Table 4 below shows PRACH mask indexes for the base station to set the PRACH resource to the user equipment. For example, in the FDD mode, the user equipment can transmit a random access preamble in one of 10 subframes, even-numbered subframes, or odd-numbered subframes according to the PRACH mask index shown in Table 4 below.

TABLE 4

| PRACH Mask Index | Allowed PRACH (FDD) | Allowed PRACH (TDD) |
| --- | --- | --- |
| 0 | All | All |
| 1 | PRACH Resource Index 0 | PRACH Resource Index 0 |
| 2 | PRACH Resource Index 1 | PRACH Resource Index 1 |
| 3 | PRACH Resource Index 2 | PRACH Resource Index 2 |
| 4 | PRACH Resource Index 3 | PRACH Resource Index 3 |
| 5 | PRACH Resource Index 4 | PRACH Resource Index 4 |
| 6 | PRACH Resource Index 5 | PRACH Resource Index 5 |
| 7 | PRACH Resource Index 6 | Reserved |
| 8 | PRACH Resource Index 7 | Reserved |
| 9 | PRACH Resource Index 8 | Reserved |
| 10 | PRACH Resource Index 9 | Reserved |
| 11 | Every, in the time domain, even PRACH opportunity $1^{st}$ PRACH Resource Index in subframe | Every, in the time domain, even PRACH opportunity $1^{st}$ PRACH Resource Index in subframe |
| 12 | Every, in the time domain, odd PRACH opportunity $1^{st}$ PRACH Resource Index in subframe | Every, in the time domain, odd PRACH opportunity $1^{st}$ PRACH Resource Index in subframe |
| 13 | Reserved | $1^{st}$ PRACH Resource Index in subframe |
| 14 | Reserved | $2^{nd}$ PRACH Resource Index in subframe |

TABLE 4-continued

| PRACH Mask Index | Allowed PRACH (FDD) | Allowed PRACH (TDD) |
| --- | --- | --- |
| 15 | Reserved | $3^{rd}$ PRACH Resource Index in subframe |

In such a contention-based or non-contention-based random access procedure, the RAR is transmitted to the user equipment through the PDSCH. Therefore, when there is a PDSCH to be transmitted to other UEs, the channel access parameter(s) is applied according to the CAPC set by the base station for transmission of the corresponding PDSCH (s) except when the RAR is transmitted independently. In the case where the RAR is independently transmitted without the PDSCH transmitted to other UEs, the PDCCH/PDSCH for the RAR transmitted to the user equipment may use the second type channel access as the fast channel access or uses the highest priority (for example, CAPC #1) to perform channel access to the PDCCH/PDSCH for the RAR to prevent unnecessary latency.

Figure 18:
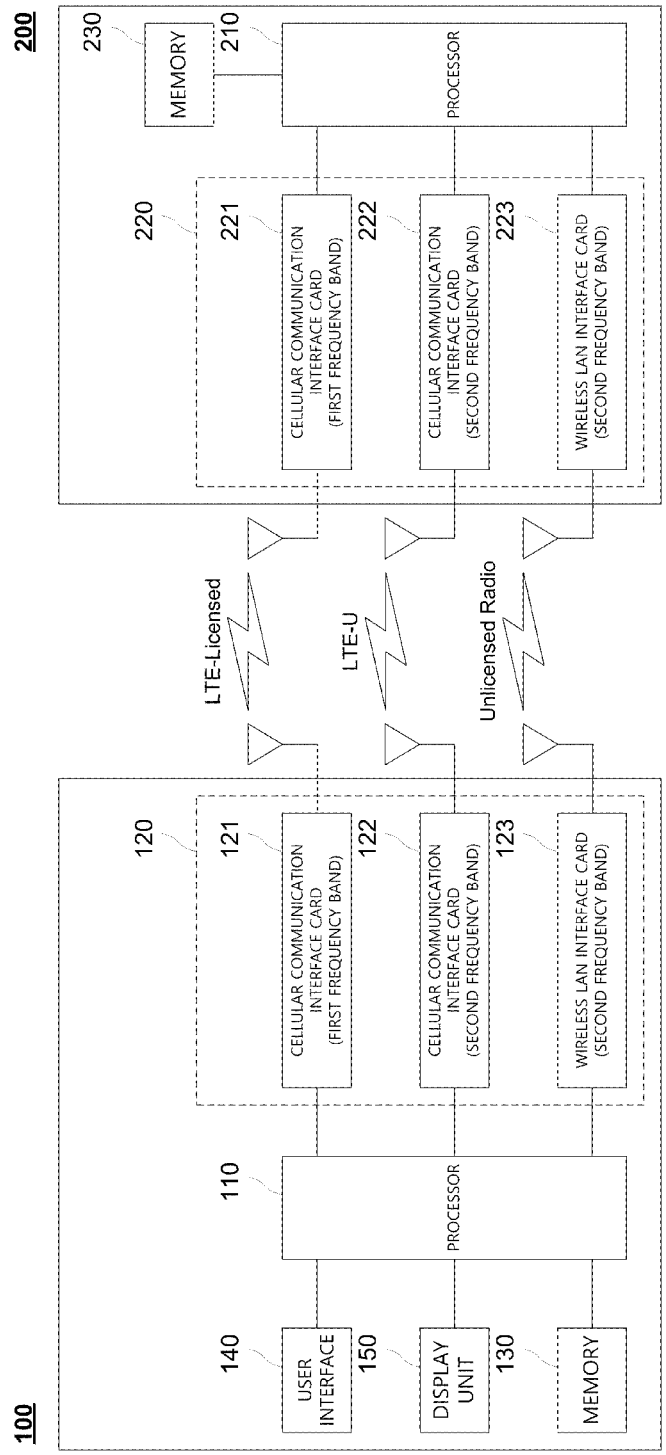
FIG. 18 illustrates configurations of a user equipment and a base station according to an exemplary embodiment of the present invention.

FIG. 18 illustrates configurations of a user equipment and a base station according to an exemplary embodiment of the present invention. In the present invention, the user equipment may be implemented by various types of wireless communication devices or computing devices of which portability and mobility are guaranteed. The user equipment (UE) may be referred to as terminal, a station (STA), a mobile subscriber (MS), and the like. In the present invention, the base station may control and take charge of cells (e.g., a macro cell, a femto cell, a pico cell, and the like) corresponding to service areas and perform functions including signal transmission, channel designation, channel monitoring, self diagnosis, relay, and the like. The base station may be referred to as an evolved NodeB (eNB), an access point (AP), and the like.

Referring to FIG. 18, the user equipment 100 may include a processor 110, a communication module 120, a memory 130, a user interface unit 140, and a display unit 150.

The processor 110 may execute various commands or programs according to the present invention and process data in the user equipment 100. Further, the processor 100 may control all operations of the respective units of the user equipment 100 and control data transmission/reception among the units. For example, the processor 110 may receive a DL signal in an LTE-U cell in an LAA environment and transmit an HARQ-ACK response thereto to the base station.

The communication module 120 may be an integrated module that performs mobile communication using a mobile communication network and wireless LAN access using a wireless LAN. To this end, the communication module 120 may include a plurality of network interface cards such as cellular communication interface cards 121 and 122 and a wireless LAN interface card 123 in an internal or external type. In FIG. 18, the communication module 120 is illustrated as the integrated module, but the respective network interface cards may be independently disposed according to a circuit configuration or a purpose unlike FIG. 18.

The cellular communication interface card 121 transmits/receives a radio signal to/from at least one of a base station 200, an external device, and a server by using the mobile communication network and provides a cellular communication service at a first frequency band based on a command of the processor 110. The cellular communication interface card 121 may include at least one NIC module using an LTE-licensed frequency band. The cellular communication interface card 122 transmits/receives the radio signal to/from at least one of the base station 200, the external device, and the server by using the mobile communication network and provides the cellular communication service at a second frequency band based on the command of the processor 110. The cellular communication interface card 122 may include at least one NIC module using an LTE-unlicensed frequency band. For example, the LTE-unlicensed frequency band may be a band of 2.4 GHz or 5 GHz.

The wireless LAN interface card 123 transmits/receives the radio signal to/from at least one of the base station 200, the external device, and the server through wireless LAN access and provides a wireless LAN service at the second frequency band based on the command of the processor 110. The wireless LAN interface card 123 may include at least one NIC module using a wireless LAN frequency band. For example, the wireless LAN frequency band may be an unlicensed radio band such as the band of 2.4 GHz or 5 GHz.

The memory 130 stores a control program used in the user equipment 100 and various resulting data. The control program may include a program required for the user equipment 100 to perform wireless communication with at least one of the base station 200, the external device, and the server. The user interface 140 includes various types of input/output means provided in the user equipment 100. The display unit 150 outputs various images on a display screen.

Further, the base station 200 according to the exemplary embodiment of the present invention may include a processor 210, a communication module 220, and a memory 230.

The processor 210 may execute various commands or programs according to the present invention and process data in the base station 200. Further, the processor 210 may control all operations of the respective units of the base station 200 and control data transmission/reception among the units. For example, the processor 210 may perform downlink transmission based on a channel access in an LAA environment. In detail, the processor 210 may perform the downlink transmission, verification of an HARQ-ACK feedback set, CWS adjustment, and the like according to cases 1, 2-1, and 2-2.

The communication module 220 may be an integrated module that performs the mobile communication using the mobile communication network and the wireless LAN access using the wireless LAN like the communication module 120 of the user equipment 100. To this end, the communication module 120 may include a plurality of network interface cards such as cellular communication interface cards 221 and 222 and a wireless LAN interface card 223 in the internal or external type. In FIG. 18, the communication module 220 is illustrated as the integrated module, but the respective network interface cards may be independently disposed according to the circuit configuration or the purpose unlike FIG. 18.

The cellular communication interface card 221 transmits/receives the radio signal to/from at least one of the user equipment 100, the external device, and the server by using the mobile communication network and provides the cellular communication service at the first frequency band based on a command of the processor 210. The cellular communication interface card 221 may include at least one NIC module using the LTE-licensed frequency band. The cellular communication interface card 222 transmits/receives the radio signal to/from at least one of the user equipment 100, the external device, and the server by using the mobile communication network and provides the cellular communication service at the second frequency band based on the command of the processor 210. The cellular communication interface card 222 may include at least one NIC module using the LTE-unlicensed frequency band. The LTE-unlicensed frequency band may be the band of 2.4 GHz or 5 GHz.

The wireless LAN interface card 223 transmits/receives the radio signal to/from at least one of the user equipment 100, the external device, and the server through the wireless LAN access and provides the wireless LAN service at the second frequency band based on the command of the processor 210. The wireless LAN interface card 223 may include at least one NIC module using the wireless LAN frequency band. For example, the wireless LAN frequency band may be the unlicensed radio band such as the band of 2.4 GHz or 5 GHz.

In FIG. 18, blocks of the user equipment and the base station logically divide and illustrate elements of the device. The elements of the device may be mounted as one chip or a plurality of chips according to design of the device. Further, some components of the user equipment 100, that is to say, the user interface 140 and the display unit 150 may be selectively provided in the user equipment 100. Further, some components of the base station 200, that is to say, the wireless LAN interface 223, and the like may be selectively provided in the base station 200. The user interface 140 and the display unit 150 may be additionally provided in the base station 200 as necessary.

The method and the system of the present invention are described in association with the specific embodiments, but some or all of the components and operations of the present invention may be implemented by using a computer system having a universal hardware architecture.

The description of the present invention is used for illustration and those skilled in the art will understand that the present invention can be easily modified to other detailed forms without changing the technical spirit or an essential feature thereof. Therefore, the aforementioned exemplary embodiments are all illustrative in all aspects and are not limited. For example, each component described as a single type may be implemented to be distributed and similarly, components described to be distributed may also be implemented in a combined form.

The scope of the present invention is represented by the claims to be described below rather than the detailed description, and it is to be interpreted that the meaning and scope of the claims and all the changes or modified forms derived from the equivalents thereof come within the scope of the present invention.

INDUSTRIAL APPLICABILITY

The present invention is usable in various communication devices (e.g., a station or access point using unlicensed band communication, a station or a base station using cellular communication, or the like) used in a wireless communication system.

The invention claimed is:

1. A method for performing, by a user equipment, an uplink transmission to a base station through an unlicensed cell in a wireless communication system, the method comprising:
   receiving a physical downlink control channel (PDCCH), from a base station, including a downlink control information (DCI) for scheduling an uplink transmission on one or more subframes, wherein the DCI indicates a first type channel access or a second type channel access and a priority class; and performing the uplink transmission on the one or more subframes using the first type channel access or the second type channel access, wherein the uplink transmission is performed based on at least one parameter determined by the priority class, and wherein the at least one parameter for the first type channel access is determined according to the priority class indicated in the DCI when the uplink transmission in which the second type channel access is indicated is stopped on the one or more subframes.

2. The method of claim 1,
wherein the at least one parameter for the first type channel access is determined according to the priority class indicated in the DCI when the first type channel access is indicated.

3. The method of claim 1,
wherein the uplink transmission is performed using the first type channel access for the priority class in a subframe after a specific subframe when the second type channel access for the uplink transmission on the one or more subframes is indicated by the DCI and the user equipment has stopped the uplink transmission during or before the specific subframe among the one or more subframes.

4. The method of claim 1,
wherein the at least one parameter for the first type channel access is determined according to the priority class indicated in the DCI, and
wherein the uplink transmission is performed based on the priority class, which is a priority class used by the base station when the second type channel access is indicated in the DCI.

5. The method of claim 1,
wherein the one or more subframes are not allocated more than subframes needed to transmit all traffics of a priority class having a value equal to or less than the priority class selected for the uplink transmission.

6. The method of claim 1,
wherein a random backoff counter is used for the first type channel access, and is not used for the second type channel access.

7. The method of claim 1, wherein the performing the uplink transmission further comprises:
performing the uplink transmission on a next subframe of a specific subframe by using the first type channel access or the second type channel access indicated in the DCI when a channel access in the specific subframe among the one or more subframes is failed.

8. The method according to claim 1,
wherein the at least one parameter for the first type channel access comprises, based on the priority class, a first parameter for determining a size of a contention window (CW) for the first type channel access and a second parameter for determining an uplink maximum channel occupancy time.

9. A user equipment in a wireless communication system, the user equipment comprising:
a wireless communication module; and
a processor, wherein the processor is configured to:
receive a physical downlink control channel (PDCCH), from a base station, including a downlink control information (DCI) for scheduling an uplink transmission on one or more subframes,
wherein the DCI indicates a first type channel access or a second type channel access and a priority class, and
perform the uplink transmission on the one or more subframes using the first type channel access or the second type channel access,
wherein the uplink transmission is performed based on at least one parameter determined by the priority class, and
wherein the at least one parameter for the first type channel access is determined according to the priority class indicated in the DCI when the uplink transmission in which the second type channel access is indicated is stopped on the one or more subframes.

10. The method of claim 9,
wherein the at least one parameter for the first type channel access is determined according to the priority class indicated in the DCI when the first type channel access is indicated.

11. The method of claim 9,
wherein the uplink transmission is performed using the first type channel access for the priority class in a subframe after a specific subframe when the second type channel access for the uplink transmission on the one or more subframes is indicated by the DCI and the user equipment has been-stopped the uplink transmission during or before the specific subframe among the one or more subframes.

12. The method of claim 9,
wherein the at least one parameter for the first type channel access is determined according to the priority class indicated in the DCI, and
wherein the uplink transmission is performed based on the priority class, which is a priority class used by the base station when the second type channel access is indicated in the DCI.

13. The method of claim 9,
wherein the one or more subframes are not allocated more than subframes needed to transmit all traffics of a priority class having a value equal to or less than the priority class selected for the uplink transmission.

14. The method of claim 9,
wherein a random backoff counter is used for the first type channel access, and is not used for the second type channel access.

15. The method of claim 9,
wherein the processor performs the uplink transmission on a next subframe of a specific subframe by using the first type channel access or the second type channel access indicated in the DCI when a channel access in the specific subframe among the one or more subframes is failed.

16. The method according to claim 9,
wherein the at least one parameter for the first type channel access comprises, based on the priority class, a first parameter for determining a size of a contention window (CW) for the first type channel access and a second parameter for determining an uplink maximum channel occupancy time.

* * * * *